(12) United States Patent
Kim et al.

(10) Patent No.: US 11,961,256 B2
(45) Date of Patent: Apr. 16, 2024

(54) METHOD FOR INDOOR LOCALIZATION USING DEEP LEARNING

(71) Applicant: 3I INC., Daegu (KR)

(72) Inventors: Ken Kim, Seoul (KR); Ji Wuck Jung, Goyang-si (KR); Farkhod Khudayberganov, Seoul (KR)

(73) Assignee: 3i Inc., Daegu (KR)

( * ) Notice: Subject to any disclaimer, the term of this patent is extended or adjusted under 35 U.S.C. 154(b) by 464 days.

(21) Appl. No.: 17/412,717

(22) Filed: Aug. 26, 2021

(65) Prior Publication Data

US 2022/0130069 A1 Apr. 28, 2022

Related U.S. Application Data

(63) Continuation of application No. PCT/KR2021/002213, filed on Feb. 22, 2021.

(30) Foreign Application Priority Data

Oct. 26, 2020 (KR) .................. 10-2020-0139152
Oct. 26, 2020 (KR) .................. 10-2020-0139176

(51) Int. Cl.
*G06T 7/73* (2017.01)
*G06F 18/22* (2023.01)
(Continued)

(52) U.S. Cl.
CPC .............. *G06T 7/74* (2017.01); *G06F 18/22* (2023.01); *G06N 3/08* (2013.01); *G06V 10/757* (2022.01);
(Continued)

(58) Field of Classification Search
CPC .......... G06N 3/044; G06N 3/045; G06N 3/08; G06T 2207/20081; G06T 2207/20084;
(Continued)

(56) References Cited

U.S. PATENT DOCUMENTS

| | | |
|---|---|---|
| 2014/0222783 A1 | 8/2014 | Chang et al. |
| 2017/0076195 A1 | 3/2017 | Yang et al. |
| 2019/0020817 A1* | 1/2019 | Shan ............... H04N 23/698 |

FOREIGN PATENT DOCUMENTS

| | | |
|---|---|---|
| JP | 2006065399 | 3/2006 |
| JP | 2010062911 | 3/2010 |

(Continued)

OTHER PUBLICATIONS

International Search Report dated Jul. 14, 2021 in International Application No. PCT/KR2021/002213, in 4 pages.

(Continued)

*Primary Examiner* — Kenny A Cese
(74) *Attorney, Agent, or Firm* — JCIPRNET

(57) ABSTRACT

The described technology is a technique related to an indoor localization method using deep learning. The indoor localization method comprises: opening a 3D tour comprising a plurality of panoramic images; receiving a first perspective image captured by a camera provided in the user device; calculating global features for the first perspective image and each of the plurality of panoramic images included in the 3D tour; selecting a most similar panoramic image to the first perspective image by using the calculated global features; computing an indoor location corresponding to a location of the camera on the 3D tour by using feature points included in the selected panoramic image and the first perspective image; and providing the computed indoor location to the user device.

20 Claims, 17 Drawing Sheets

(51) Int. Cl.
*G06N 3/08* (2023.01)
*G06V 10/75* (2022.01)
*H04N 5/262* (2006.01)
*H04N 23/698* (2023.01)

(52) U.S. Cl.
CPC ......... *G06V 10/759* (2022.01); *H04N 5/2628* (2013.01); *H04N 23/698* (2023.01); *G06T 2207/20081* (2013.01); *G06T 2207/20084* (2013.01); *G06T 2207/30244* (2013.01)

(58) Field of Classification Search
CPC ............ G06T 2207/30244; G06T 7/74; G06V 10/757; G06V 10/759; G06V 10/82; G06V 20/20; G06F 18/22; H04N 23/698
See application file for complete search history.

(56) References Cited

FOREIGN PATENT DOCUMENTS

| | | |
|---|---|---|
| JP | 2017220230 | 12/2017 |
| JP | 2019125227 | 7/2019 |
| JP | 2019212296 | 12/2019 |
| KR | 10-1854612 B1 | 5/2018 |
| KR | 10-2020-0020937 A | 2/2020 |
| KR | 20200046437 | 5/2020 |
| WO | 2020194792 | 10/2020 |

OTHER PUBLICATIONS

Halavataya, "Local Feature Descriptor Indexing for Image Matching and Object Detection in Real-Time Applications", Pattern Recognition and Image Analysis, Mar. 21, 2020, vol. 30, No. 1, pp. 16-21.
Kim et al., "Precise Rectification of Misaligned Stereo Images for 3D Image Generation", published Mar. 30, 2012, retrieved from the Internet Jul. 5, 2021, http://koreascience.or.kr/article/JAKO201212334988490.page.
Yafei Dong et al., "Own position/orientation estimation by image retrieval using BoF segmentation representation" with English Abstract, IPSJ SIG Technical Report, vol. 2013, May 2013, pp. 1-7.
Henrik Andreasson et al., "Self-localization in non-stationary environments using omni-directional vision," Robotics and Autonomous Systems, vol. 55, Feb. 2007, pp. 541-551.

\* cited by examiner

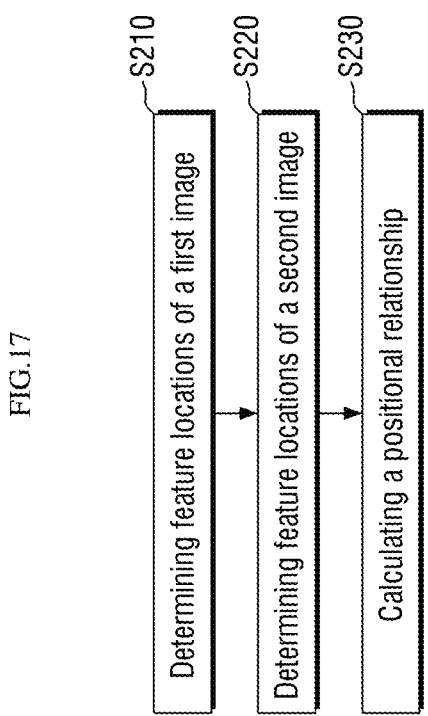

METHOD FOR INDOOR LOCALIZATION USING DEEP LEARNING

CROSS-REFERENCE TO RELATED APPLICATION

This is a continuation application of International Patent Application No. PCT/KR2021/002213, filed on Feb. 22, 2021, which claims priority to Korean Patent Application No. 10-2020-0139152 filed on Oct. 26, 2020 and Korean Patent Application No. 10-2020-0139176 filed on Oct. 26, 2020 in the Korean Intellectual Property Office, and all the benefits accruing therefrom under 35 U.S.C. 119, the contents of each of which in their entirety are herein incorporated by reference.

BACKGROUND

Field

The described technology relates to an indoor localization method using deep learning. Specifically, the described technology relates to a method of performing indoor localization in a 3D tour based on an image captured by a user, and uses a deep learning technique to improve the accuracy of indoor localization.

Description of the Related Technology

The best way to record a 3D space is to capture omnidirectional 360-degree views of the space and save them in a 360-degree image form, and create a form of a 3D tour by connecting the 360-degree images for each location.

A 360-degree camera is commonly used to obtain 360-degree images. A 360-degree camera is a device capable of generating surrounding background information as an image using one or two or more wide-angle lenses. The 360-degree camera captures horizontal and vertical 360-degrees omni-directionally to create 360-degree photos and videos. Photos and videos captured by a 360-degree camera can be transmitted to and received from various places such as servers and user devices.

In addition, a '3D tour' may comprise a combination of images (e.g., panoramic images) captured respectively at 360 degrees at a plurality of points and saved. In this case, the '3D tour' may include location information in which each image was captured, and each location information may be mapped onto a floor plan and provided to users.

The 3D tours created as such may be provided to users in the form of virtual reality (VR) or augmented reality (AR). In this case, the 3D tour may be synchronized to move along with the movement of a user. In addition, it is possible to provide an indoor navigation function of the 3D tour following the movement of the user.

In order to implement such an indoor navigation function, a matching operation between an existing 3D tour and the current location of a user should be prioritized, and in this process, the task of extracting features of the 3D tour and the image provided by the user should be preceded.

SUMMARY

It is an object of the described technology to provide a method for indoor localization using a global feature extracted through deep learning for accurate and fast matching between a panoramic image included in a 3D tour and a perspective image provided by a user.

In addition, it is an object of the described technology to provide a method for indoor localization by selecting a panoramic image having the highest similarity to a perspective image provided by a user, based on a ranking system using a plurality of parameters.

The objects of described technology are not limited to those mentioned above, and other objects and advantages of the described technology that have not been mentioned can be understood by the following description, and will be more clearly understood by embodiments of the described technology. In addition, it will be readily understood that the objects and advantages of the described technology can be realized by the means and combinations thereof set forth in the claims.

One aspect is a method for the indoor localization performed in a 3D tour providing server operating in conjunction with a user device, the method comprising: opening a 3D tour comprising a plurality of panoramic images, receiving a first perspective image captured by a camera provided in the user device, calculating global features for the first perspective image and each of the plurality of panoramic images included in the 3D tour, selecting a most similar panoramic image to the first perspective image by using the calculated global features, computing an indoor location corresponding to a location of the camera on the 3D tour by using feature points included in the selected panoramic image and the first perspective image, and providing the computed indoor location to the user device.

In the above method, wherein the calculating global feature comprises: (a) converting a particular panoramic image included in the 3D tour into a plurality of second perspective images; and (b) calculating respective global features for the converted second perspective images and a global feature for the panoramic image.

In the above method, wherein the step (a): projects the particular panoramic image onto a spherical coordinate system, to thereby divide it into a plurality of regions, and converts images corresponding to the respective divided regions into the second perspective images, which are two-dimensional images, and wherein the plurality of second perspective images includes areas partially overlapping each other.

In the above method, wherein the step (b): calculates the global features using a deep learning module that has been subjected to learning in advance so that a same global feature is outputted for images captured the same place, and wherein the deep learning module comprises: one or more neural network modules; a similarity determination module configured to calculate similarities of values outputted from the neural network modules, a weight module configured to apply weights to the calculated similarities and based on this, to output result values, and a feedback module configured to derive a difference value between result values outputted at different time points from the weight module, and to provide the derived difference value as feedback to the neural network modules.

In the above method, wherein the neural network module adjusts a weight applied to a neural network included in the neural network module, based on a feedback value received from the feedback module.

In the above method, wherein the similarity determination module receives a first global feature for the panoramic image, a second global feature for the second perspective image, a third global feature for a comparative image, and a fourth global feature corresponding to a ground truth for the panoramic image, and calculates similarities between the first to fourth global features, using a cosine distance function.

In the above method further comprising: deriving classification information, position information, caption, and segmentation for the first perspective image and the plurality of panoramic images, wherein the calculating a most similar panoramic image comprises: (c1) computing a similarity for each parameter between the panoramic image and the first perspective image, based on the derived global features, the classification information, the position information, the caption, and the segmentation, and (d) calculating a ranking based on the similarity for each parameter, and selecting a panoramic image that is the highest in the ranking.

In the above method, wherein the calculating a most similar panoramic image comprises: (c2) computing similarities between second perspective images generated based on the panoramic image and a first perspective image received from the user device, counting the number of images of the second perspective images with the similarities at or higher than a predetermined reference value for each panoramic image, and determining a weight of each panoramic image based on the counted number.

In the above method, wherein the step (d) comprises: selecting a panoramic image having a highest similarity to the first perspective image, by using the similarity between the panoramic image and the first perspective image for the derived global features, the classification information, the position information, the caption, and the segmentation, and the weight for the panoramic image.

In the above method, wherein the computing an indoor location comprises: calculating local features for the calculated panoramic image, calculating local features for the perspective image, and computing an indoor location corresponding to a location of the camera on the 3D tour based on the calculated local features.

Another aspect is a method for the indoor localization performed in a 3D tour providing server operating in conjunction with a user device, the method comprising: opening a 3D tour comprising a plurality of panoramic images, receiving a perspective image captured by a camera provided in the user device, calculating global features for the plurality of panoramic images and the perspective image, selecting a panoramic image most similar to the perspective image by using the calculated global features, calculating local features for the selected panoramic image and the perspective image, computing an indoor location corresponding to the camera location on the 3D tour based on the calculated local features, and providing the computed indoor location to a user.

In the above method, wherein in the calculating local features, a process of generating a first patch for the panoramic image is configured differently from a process of generating a second patch for the perspective image.

In the above method, wherein the calculating local features comprises: (a) converting the panoramic image into a plurality of layers of different sizes, (b) extracting a key point (KP) from the converted plurality of layers, and generating a first patch corresponding to the extracted key point, and (c) deriving a first local feature for the first patch.

In the above method, wherein in the step (a), the plurality of layers comprises: a first layer of the same size as the panoramic image, a second layer obtained by converting the first layer at a predetermined ratio, and a third layer obtained by converting the second layer at the predetermined ratio.

In the above method, wherein the step (b) comprises: extracting position information of a key point for each of the plurality of layers of the panoramic image, projecting the panoramic image onto a spherical coordinate system, and extracting a patch of an area corresponding to the position information, and converting the extracted patch into the first patch, which is a two-dimensional image.

In the above method, wherein in the step (c), the first local feature is a vector value of a predetermined magnitude, and further comprising outputting coordinate information including a first-axis coordinate for the first patch, a second-axis coordinate intersecting the first-axis, and a scale.

In the above method, wherein the calculating local features comprises: (a) converting the perspective image into a plurality of layers of different sizes, (b) extracting a key point (KP) from the converted plurality of layers, and generating a second patch corresponding to the extracted key point, and (c) deriving a second local feature for the second patch.

In the above method, wherein the calculating local features: calculates the local features using a deep learning module that has been subjected to learning in advance so that a unified local feature is outputted for images captured the same place, and wherein the deep learning module comprises: a descriptor extractor comprising one or more neural network modules, and a weight module configured to apply weights to the neural network modules, and based on this, to output result values, and a multi-patch loss calculator configured to derive a difference value between result values outputted at different time points from the descriptor extractor, and to provide the derived difference value as feedback to the descriptor extractor.

In the above method, wherein the multi-patch loss calculator receives a first local feature of a first patch for the panoramic image and a second local feature of a second patch for the perspective image, and comprises calculating a similarity between the first and second local features using a cosine distance function.

In the above method, wherein the computing an indoor location calculates an indoor location of a user who has provided the perspective image, based on the first and second local features, and comprises calculating the indoor location by determining a relative positional relationship through an epipolar geometry algorithm based on locations of the first and second local features, or by determining the relative positional relationship through a method using a transformation matrix for connecting images.

The effects of the described technology are not limited to those described above, and those skilled in the art of the described technology can readily derive various effects of the described technology from the configurations of the described technology.

BRIEF DESCRIPTION OF THE DRAWINGS

FIG. 17 is a flowchart for illustrating a method for mapping images in an indoor localization method in accordance with an embodiment of the described technology.

DETAILED DESCRIPTION

Figure 1:
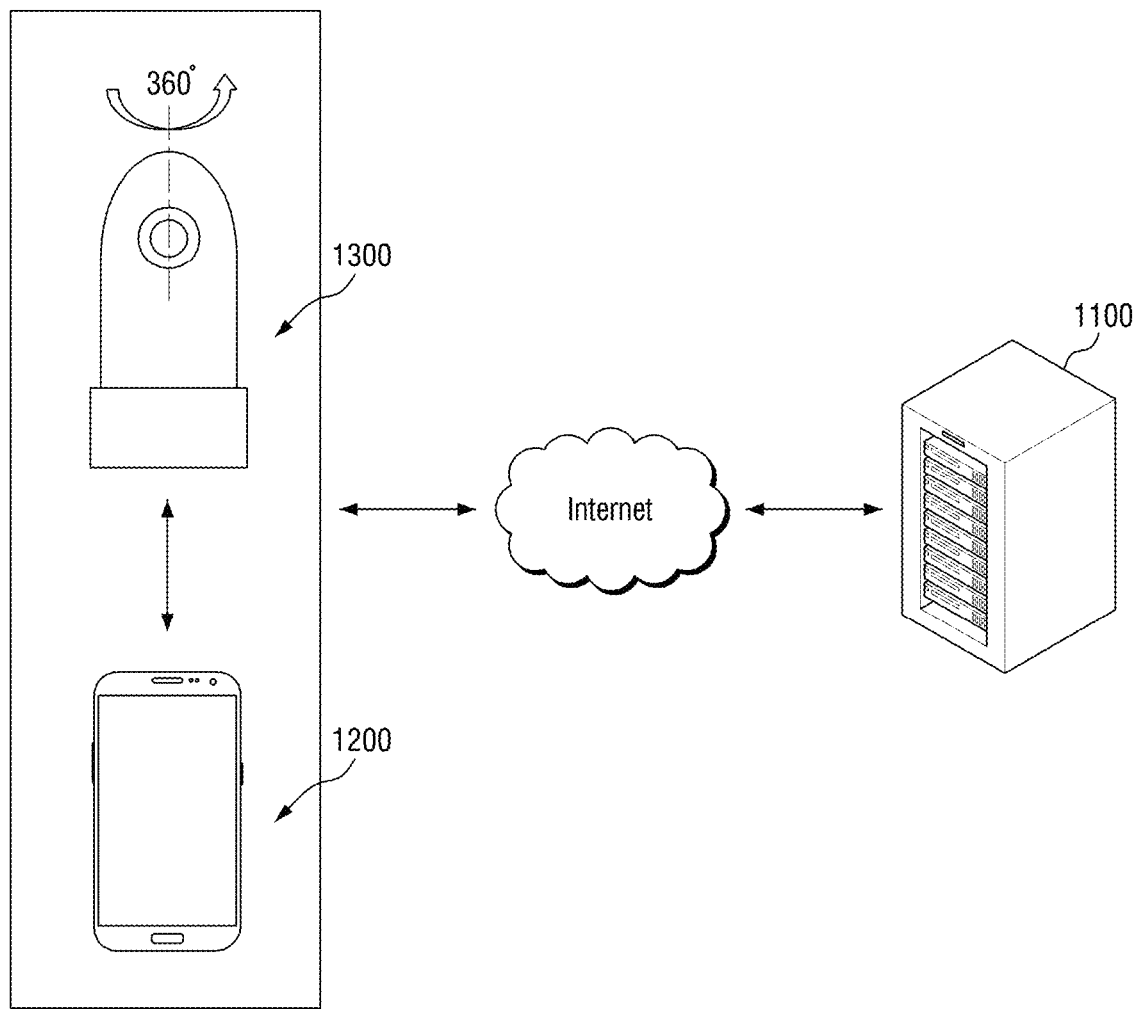
FIG. 1 is a schematic diagram showing a 3D tour providing system in accordance with an embodiment of the described technology.

The advantages and features of the described technology and methods of achieving them will be apparent when reference is made to the embodiments described in detail below in conjunction with the accompanying drawings. However, the described technology is not limited to the embodiments disclosed below but will be implemented in a variety of different forms, the present embodiments merely make the disclosure of the described technology complete and are provided to fully convey the scope of the invention to those having ordinary skill in the art to which the described technology pertains, and the described technology is defined only by the scope of the claims. Like reference numerals refer to like components throughout the specification.

The terms used herein are for describing embodiments and are not intended to limit the described technology. Herein, singular forms also include plural forms unless specifically stated in the context. As used herein, "comprises" and/or "comprising" means that the components, steps, operations, and/or elements mentioned do not preclude the presence or addition of one or more other components, steps, operations and/or elements.

Unless otherwise defined, all terms (including technical and scientific terms) used herein will be used in the sense that can be commonly understood by those of ordinary skill in the art to which the described technology pertains. Further, terms defined in commonly used dictionaries are not to be interpreted ideally or excessively unless explicitly defined specifically.

In the described technology, a '3D tour' may comprise a combination of images (e.g., panoramic images) captured respectively at 360 degrees at a plurality of points and saved. In this case, the '3D tour' may include respective location information and direction information in which the plurality of images are captured.

Here, each location information may be mapped onto a floor plan and provided to users. Further, the location information and direction information derived while moving the 360-degree camera when capturing a 3D tour may be used to calculate the movement paths of a user, and the movement paths derived may be displayed on a user device.

Further, deep learning in the described technology is a technique used to cluster or classify objects or data. In other words, deep learning is a technique that inputs a large amount of data into a computer and classifies them into similar ones. In this case, a number of machine learning algorithms have already appeared over how to classify data. Deep learning is a machine learning method proposed to overcome the limitations of artificial neural networks.

To describe in more detail, a deep learning technique, which is a type of machine learning, goes down to a deep level in multiple stages based on data and learns.

Deep learning may represent a set of machine learning algorithms that extract core data from a plurality of data as the level goes up.

Deep learning structures may include artificial neural networks (ANN), and for example, the artificial neural network structure of deep learning may comprise a deep neural network (DNN) such as a convolutional neural network (CNN), a recurrent neural network (RNN), and a deep belief network (DBN). However, the described technology is not limited thereto, and it is apparent to those of ordinary skill in the art that various artificial neural network structures of deep learning may be employed in the described technology.

In the following, an indoor localization method using deep learning in accordance with an embodiment of the described technology will be described in detail with reference to the drawings.

FIG. 1 is a schematic diagram showing a 3D tour providing system in accordance with an embodiment of the described technology. Here, the 3D tour providing system will be described on the premise that it is an execution subject that implements the indoor localization method in accordance with some embodiments of the described technology.

Referring to FIG. 1, the 3D tour providing system in accordance with an embodiment of the described technology includes a 3D tour providing server 1100, a user device 1200, and a 360-degree camera 1300.

The 3D tour providing server 1100 and the user device 1200 may be implemented as a server-client system. The 3D tour providing server 1100 may send/receive data to and from the user device 1200 through a wired/wireless network.

In this case, the 3D tour providing server 1100 may select a panoramic image corresponding to a particular point in a 3D tour selected by a user and provide it to the user device 1200. The panoramic image selected may be converted into a 3D form and displayed on the screen of the user device 1200. In addition, the 3D tour providing server 1100 may calculate the location information of the point corresponding to a particular image provided by the user and provide it to the user device 1200, so as to display it on the 3D tour displayed on the user device 1200.

The 360-degree camera 1300 may generate a 360-degree image (e.g., a panoramic image) of a particular point and transmit it to the 3D tour providing server 1100. The 3D tour providing server 1100 may create 3D tours based on a plurality of 360-degree images received from the 360-degree camera 1300 and provide them to the user device 1200.

At this time, the 360-degree camera 1300 may send and receive data to and from the 3D tour providing server 1100 via the user device 1200. Also, in another embodiment, the 360-degree camera 1300 may directly send and receive data to and from the 3D tour providing server 1100 over a network.

Although only one user device 1200 and 360-degree camera 1300 are shown in the drawing, the described technology is not limited thereto, and the 3D tour providing server 1100 may operate in conjunction with a plurality of user devices 1200 and 360-degree cameras 1300.

The 3D tour providing server 1100 may store and manage a plurality of 3D tours. In addition, the 3D tour providing server 1100 may compute the exact location of the user based on the image captured by the camera provided in the user device 1200 and provide it to the user device 1200. In this case, the 3D tour providing server 1100 may compute the exact location of the user device 1200 by comparing a feature (e.g., a global feature or local feature) of the captured image (hereinafter, perspective image) received from the user device 1200 with features (e.g., global features or local features) of a plurality of panoramic images included in the 3D tour, without using the location information received via the GPS of the user device 1200.

In addition, the 3D tour providing server 1100 may use a deep learning technique for accurate and fast matching between the panoramic images included in the 3D tour and the perspective image provided by the user device 1200.

In other words, the 3D tour providing server 1100 may perform a localization operation of estimating the exact location of the user indoors as well by using the 3D tour and the captured image received from the user without using GPS information. At this time, the 3D tour providing server 1100 performs a pre-processing process of extracting global features and local features using deep learning in order to increase the accuracy and speed of the localization operation. Details of such a pre-processing process will be described below.

First, the overall logic of the indoor localization method performed by the 3D comparison tour system 1100 in accordance with an embodiment of the described technology will be described generally below.

Figure 2:
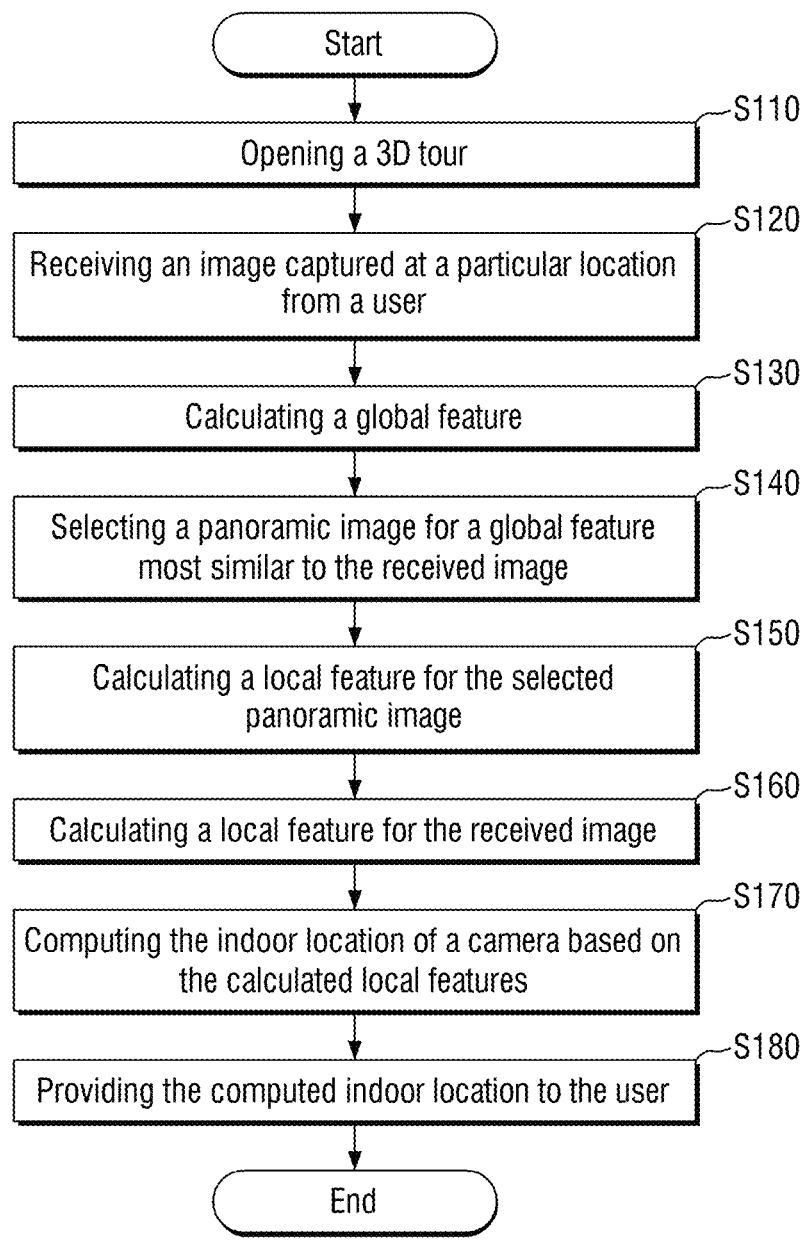
FIG. 2 is a flowchart for illustrating an indoor localization method performed in the 3D tour providing system of FIG. 1.

FIG. 2 is a flowchart for illustrating an indoor localization method performed in the 3D tour providing system of FIG. 1. In the following, the 3D tour providing server 1100 will be described as the execution subject for the convenience of description.

Referring to FIG. 2, the 3D tour providing server 1100 (hereinafter, the server) opens a 3D tour (S110). Each 3D tour is given a unique tour ID, and if a tour ID corresponding to the 3D tour selected via the user device 1200 is received, the server 1100 opens the 3D tour stored in advance in the database.

The server 1100 receives an image (hereinafter, a perspective image) captured by the user at a particular point from the user device 1200 (S120). Here, the perspective image refers to a 2D image (or a fragmentary image captured by one camera lens) captured by a camera provided in the user device 1200.

The server 1100 calculates respective global features for a plurality of panoramic images included in the 3D tour corresponding to the tour ID received (S130). In addition, the server 1100 calculates a global feature for the perspective image provided by the user.

At this time, the server 1100 calculates global features for the respective panoramic images by using a pre-learned deep learning module. Here, the global feature has a vector format, and the deep learning module outputs one global feature for one image.

Here, the deep learning module may be trained to output a same global feature for a panoramic image and a perspective image for the same place.

The server 1100 computes a similarity between the global feature of the panoramic image calculated and the global feature of the perspective image, and selects a panoramic image having a global feature closest to the perspective image (S140). That is, a panoramic image that is most similar and hence relevant to the perspective image provided by the user is selected.

To this end, the server 1100 may use a hybrid image retrieval module. Specifically, the hybrid image retrieval module may compute the similarity between respective images, through an operation (e.g., cosine distance) with each global feature in a vector format. In this case, the server 1100 may additionally compute similarities of data regarding objects, image captions, and segmentation for each image, as well as global features.

The hybrid image retrieval module may compute a weight for each panoramic image using a histogram based on the similarity between the respective images calculated. In this case, the hybrid image retrieval module may count the number of similar images between the perspective images generated from particular panoramic images and the perspective images received from the user. Based on this, the hybrid image retrieval module may give a higher weight to a panoramic image having a higher number of similar images.

The hybrid image retrieval module may calculate a ranking of the respective panoramic images based on the similarity and weight for each parameter, and based on this, select a panoramic image most similar to the perspective image provided by the user. The structure and operation method of the hybrid image retrieval module will be described in detail below.

The server 1100 calculates a local feature for the panoramic image selected (S150).

In this case, the local feature may include vector values and position information (e.g., position information including x-coordinate, y-coordinate, and a scale) for patches derived around each key point (KP) extracted from the image, and a plurality of local features may be extracted from one image. In this case, the vector values for the local feature are derived by a pre-learned deep learning module, and the deep learning module may be trained to output a unified local feature for the same key point (KP).

Likewise, the server 1100 calculates a local feature for the perspective image received from the user (S160). At this time, the server 1100 calculates the local feature by using the same pre-learned deep learning module.

The server 1100 computes an indoor location corresponding to the location of the camera that has captured the perspective image of the user, by using the local features calculated (S170).

The server 1100 provides the computed indoor location to the user device 1200 (S180).

Through this, the server 1100 may derive the exact location for the perspective image provided by the user using the deep learning module. In addition, since the exact location of a user can be derived through comparison between images without utilizing GPS information, it is possible to provide information on the exact location of the user even indoors. Furthermore, by utilizing global features and/or local features derived using pre-learned deep learning, the indoor location of the user can be derived faster and more accurately than conventional methods, and thus, the 3D tour information corresponding thereto can be provided to the user device 1200.

Additionally, in other embodiments of the described technology, any one of the method for calculating global features and the method for calculating local features described above of the described technology may be substituted by a method using handcrafted feature points or a conventional feature extraction method disclosed previously, as a matter of course.

In the following, the hybrid image retrieval module that performs steps S130 and S140 described above will be discussed specifically.

Figure 3:
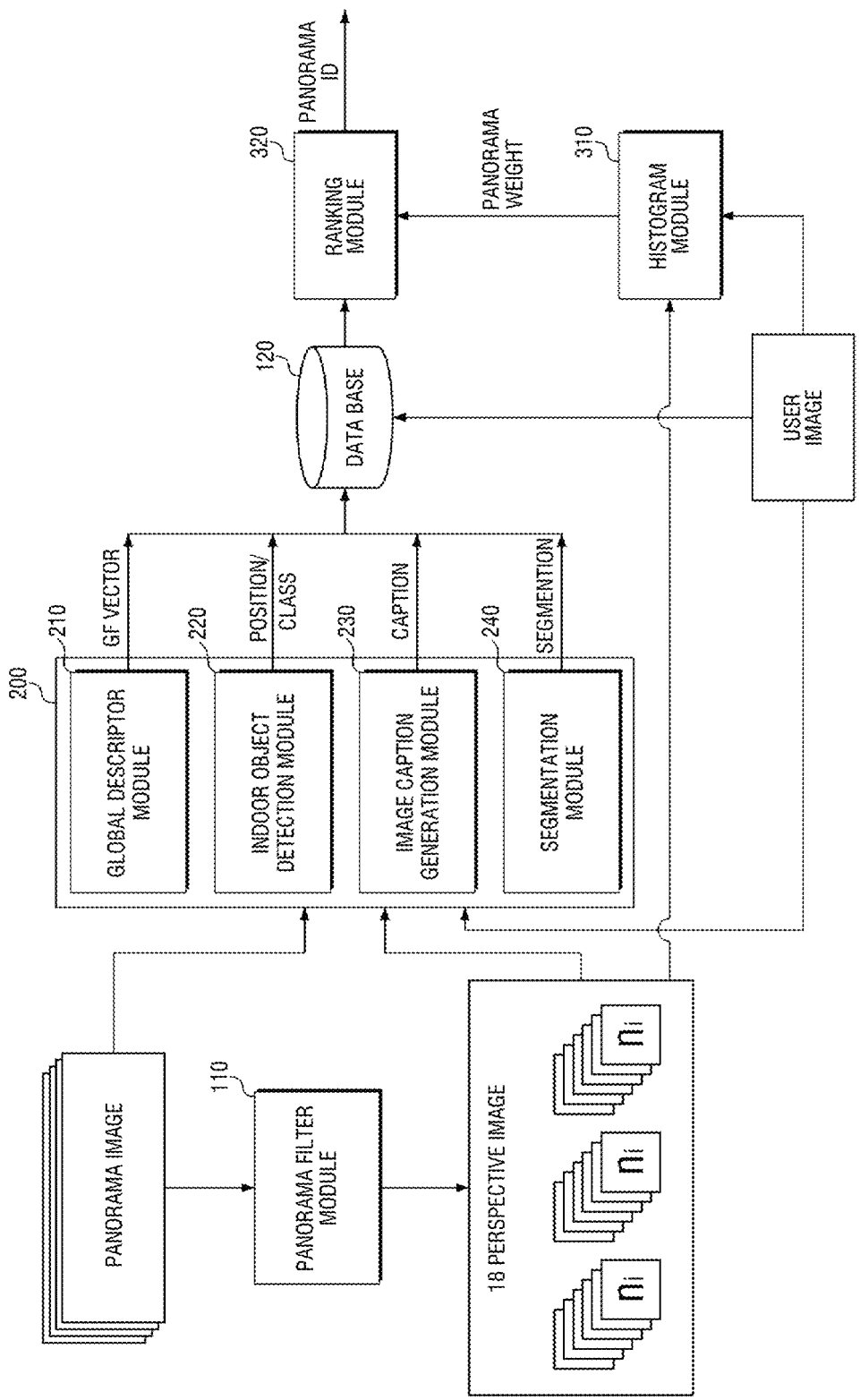
FIG. 3 is a block diagram for illustrating a hybrid image retrieval module that performs steps S130 and S140 of FIG. 2.

FIG. 3 is a block diagram for illustrating a hybrid image retrieval module that performs steps S130 and S140 of FIG. 2. FIGS. 4 to 8 are block diagrams for illustrating respective operations for a transformation module of FIG. 3.

Referring to FIG. 3, the hybrid image retrieval module in accordance with an embodiment of the described technology includes a panorama filter module 110, a database 120, a transformation module 200, a histogram module 310, and a ranking module 320.

First, the panorama filter module 110 converts one panoramic image into a plurality of perspective images. Here, the panoramic image refers to a 3D image obtained by capturing 360 degrees in all directions based on one point and combining them into one image, and may be generated by merging images captured using a plurality of lenses. The server 1100 may implement a virtual 3D space using panoramic images. On the other hand, the perspective image corresponds to a 2D image captured with one lens.

Accordingly, the panorama filter module 110 may project a panoramic image onto a spherical coordinate system and then divide it into a plurality of regions. For example, the panorama filter module 110 may project one panoramic image onto the spherical coordinate system and then divide it into eighteen (18) regions.

The panorama filter module 110 converts part of the panoramic image (i.e., 3D image) corresponding to each divided region into the form of the perspective image (i.e., 2D image). For example, if one panoramic image is divided into eighteen (18) regions, the panorama filter module 110 may generate the respective divided regions into eighteen (18) perspective images. In this case, the respective perspective images may include areas partially overlapping each other.

The transformation module 200 includes a global descriptor module 210 (hereinafter, a first module), an indoor object detection module 220 (hereinafter, a second module), an image caption generation module 230 (hereinafter, a third module), and a segmentation module 240 (hereinafter, a fourth module).

Figure 4:
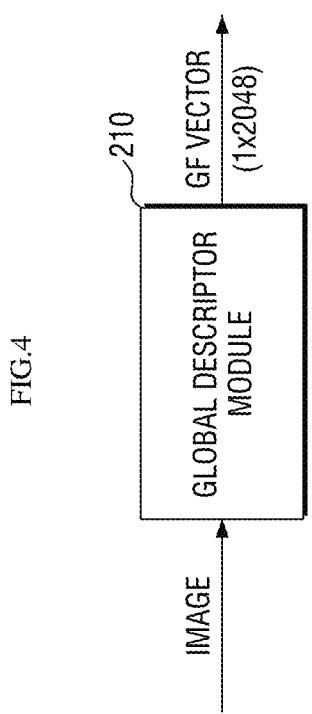
FIGS. 4 to 8 are block diagrams for illustrating respective operations for a transformation module of FIG. 3.

First, referring to FIG. 4, the first module 210 outputs a global feature for an inputted image in a vector form. For example, the global feature outputted from the first module 210 may have a vector format of 11×20481 and may be of 128 bits.

In this case, the first module 210 may include a deep learning module including a neural network, and may be subjected to learning to output a same global feature for images that have captured the same place. For example, if the server 1100 has inputted a panoramic image and a perspective image for the same place into the first module 210, the first module 210 may output the same global feature or global features with a higher similarity.

Figure 5:
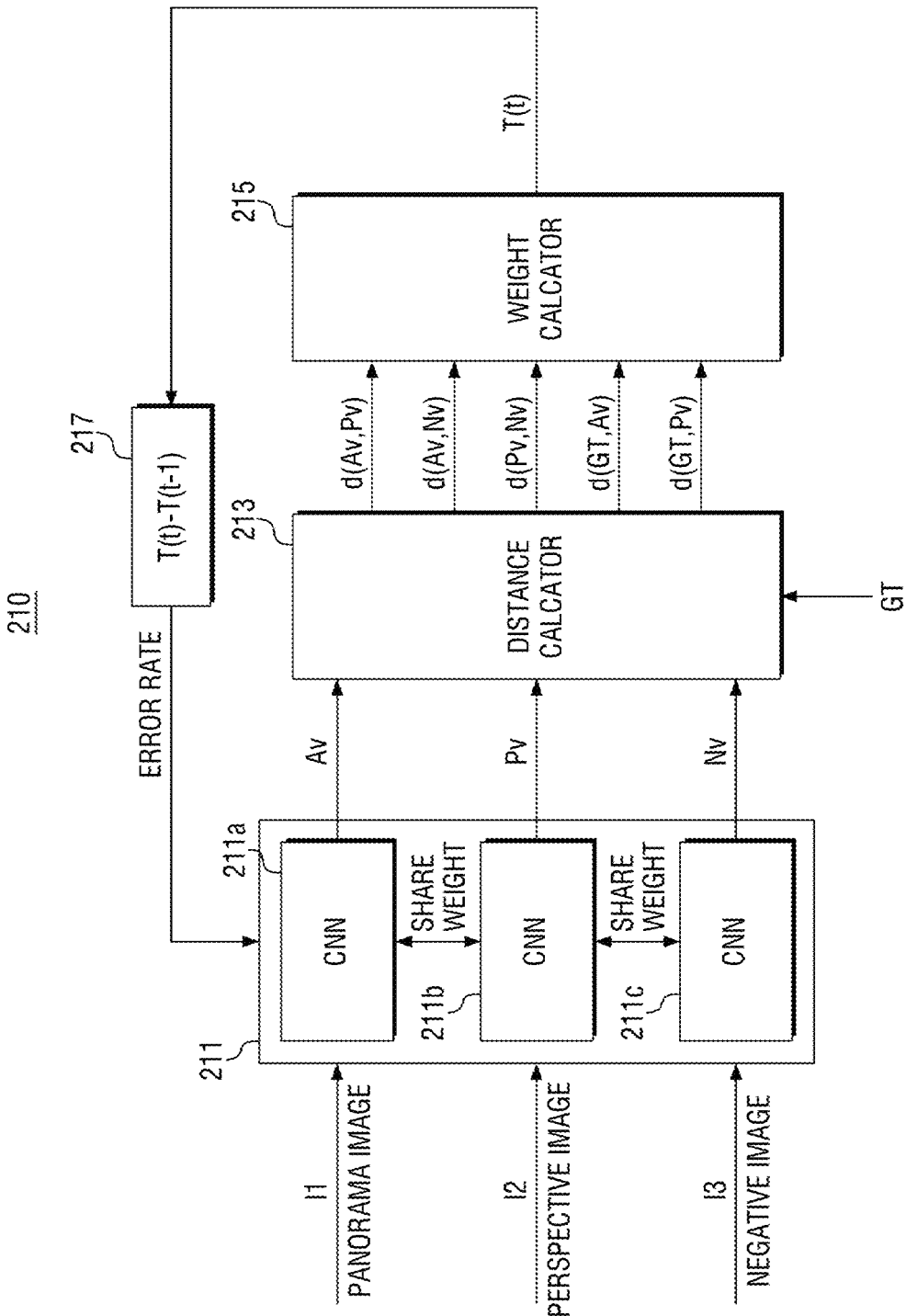

Specifically, referring to FIG. 5, the first module 210 includes a plurality of neural network modules 211 into which different images are inputted, a similarity determination module 213 (distance calculator) that calculates similarities of the values outputted from each neural network module, a weight module 215 (weight calculator) that adjusts a weight for each calculated similarity, and a feedback module 217 that provides feedback on the error of the result values.

The first module 210 basically uses a machine learning algorithm of triplet loss. Accordingly, the neural network module 211 includes three different neural network sub-modules 211a, 211b, and 211c, and different images are inputted into the respective sub-modules 211a, 211b, and 211c.

For example, a panoramic image I1 may be inputted into the first sub-module 211a, a perspective image I2 including the same target as the panoramic image I1 may be inputted into the second sub-module 211b, and a comparative image I3 (Negartive Image) dissimilar to I1 and I2 may be inputted into the third sub-module 211c.

In this case, the weight of the neural network may be shared among the respective sub-modules 211a, 211b, and 211c.

The output values Av, Pv, and Nv outputted from the respective sub-modules 211a, 211b, and 211c may have vector values, and each vector value may take the same format as the global feature described above.

The output values Av, Pv, and Nv outputted from the respective sub-modules 211a, 211b, and 211c are inputted into the similarity determination module 213. Further, a ground truth (GT) for the inputted panoramic image I1 is inputted into the similarity determination module 213.

The similarity determination module 213 computes similarities between the respective values by using the inputted output values Av, Pv, and Nv and the ground truth GT. For example, the similarity determination module 213 may calculate the similarities of the inputted values using a cosine distance function.

In this case, the similarity determination module 213 may derive a first similarity between the first result value Av for the panoramic image and the second result value Pv for the perspective image; a second similarity between the first result value Av and the third result value Nv for the comparative image; a third similarity between the second result value Pv and the third result value Nv; a fourth similarity between the first result value Av and the ground truth GT; and a fifth similarity between the second result value Pv and the ground truth GT, and may transmit them to the weight module 215. Moreover, although not shown in the drawings, the similarity determination module 213 may additionally derive a sixth similarity between the third result value Nv and the ground truth GT and transmit it to the weight module 215.

The weight module 215 may apply preset weights to the received similarities and output a result value T(t) at a first time point. For example, the weight module 215 may apply a weight of 0.6 to the first to third similarities and a weight of 0.4 to the fourth and fifth similarities, thereby deriving the result value T(t) at the first time point.

The result value T(t) outputted from the weight module 215 may be provided to the feedback module 217, and the feedback module 217 may derive a difference value between the first result value T(t) received at the first time point from the weight module 215 and the second result value T(t-1) received at the second time point, and provide the derived value to the neural network module 211 as a feedback value.

The neural network module 211 may adjust a weight for each of the neural network sub-modules 211a, 211b, and 211c by using the feedback value received.

Further, the first module 210 described above may operate in a learning mode and an execution mode.

In the learning mode, the first module 210 may be subjected to learning to increase the accuracy of determining the similarities of the respective images through a preset learning dataset. The first module 210 may output the same global feature or global features with a higher similarity for a panoramic image and a perspective image including the same target, through sufficient learning using the dataset.

In the execution mode, only one image may be inputted into the first module 210, and accordingly, the first module 210 may output a global feature for the inputted image using a learned neural network.

Referring back to FIG. 3, the first module 210 including the deep learning module that has been subjected to learning with the dataset may receive a panoramic image and a perspective image derived from the panoramic image, respectively, and may output global features (GF Vector) for the respective images inputted. The global features outputted may have vector values and may be stored in the database 120 by the ID of each image.

On the other hand, referring to FIG. 3, the second module 220 may detect an object included in an image, classify what kind of object the detected object is, and output position information using a bounding box to indicate where that object is located.

In this case, the second module 220 may use a pre-learned deep learning module to detect an object included in the image, to classify the detected object, and to extract position information of the detected object.

Figure 6:
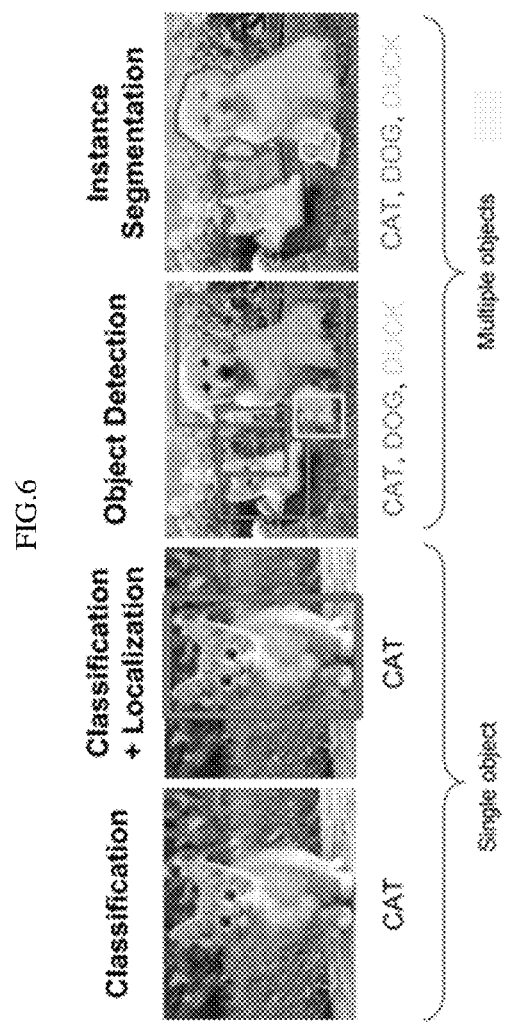

For example, referring to FIG. 6, if an image contains a cat, the second module 220 may set a bounding box in which the corresponding cat is included, determine that the object included in the corresponding bounding box is a cat and classify as such, and may output classification information and position information of the bounding box. These operations may work in the same way even when a plurality of objects is included, and the second module 220 may output classification information and position information for each of the plurality of objects. The information outputted may be transmitted to the database 120 and stored as belonging to the ID of the corresponding image.

Referring back to FIG. 3, the third module 230 outputs a description of an object included in an image in the form of text. Similarly, the third module 230 may also use a pre-learned deep learning module to detect an object included in an image, and to output a text corresponding to that object as a caption. In this case, the caption may consist of a word or a sentence including that word.

Figure 7:
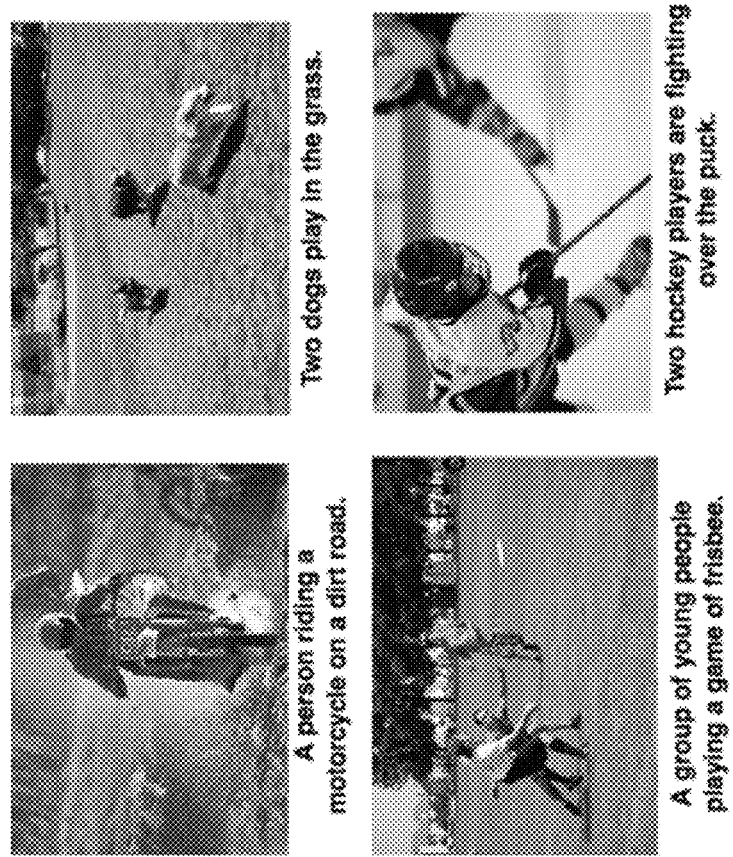

For example, referring to FIG. 6, if an image contains a cat, a dog, and a duck, the third module 230 may detect each object and output a description therefor in the form of words. With reference to FIG. 7, the third module 230 may detect objects for an image and a form of a movement for each object, and output a description therefor in the form of a sentence. The information outputted from the third module 230 may be transmitted to the database 120 and stored as belonging to the ID of the corresponding image.

Referring back to FIG. 3, the fourth module 240 may perform a segmentation operation for dividing the area of an image, and an object segmentation operation to re-join each divided area using an algorithm. The fourth module 240 divides objects of the same class into the same area. At this time, the fourth module 240 may divide objects of the same class into the same area, or may perform an operation of boundary segmentation that displays boundaries after distinguishing by different colors and dividing into different areas or semantic instance segmentation.

For example, referring to FIG. 6, the fourth module 240 may distinguish the boundaries of each animal through instance segmentation, and may separate and output the areas therefor. The information outputted from the fourth module 240 may be transmitted to the database 120 and stored as belonging to the ID of the corresponding image.

In this case, the second module 220, the third module 230, and the fourth module 240 use conventionally disclosed algorithms as specific operation methods, and a detailed description thereof will be omitted herein since the information on such algorithms has already been disclosed.

The histogram module 310 computes similarities between each of the perspective images generated based on the panoramic images and the images received from the user (i.e., the perspective images), and counts the number of similar perspective images at or higher than a predetermined reference value for each panoramic image.

Figure 8:
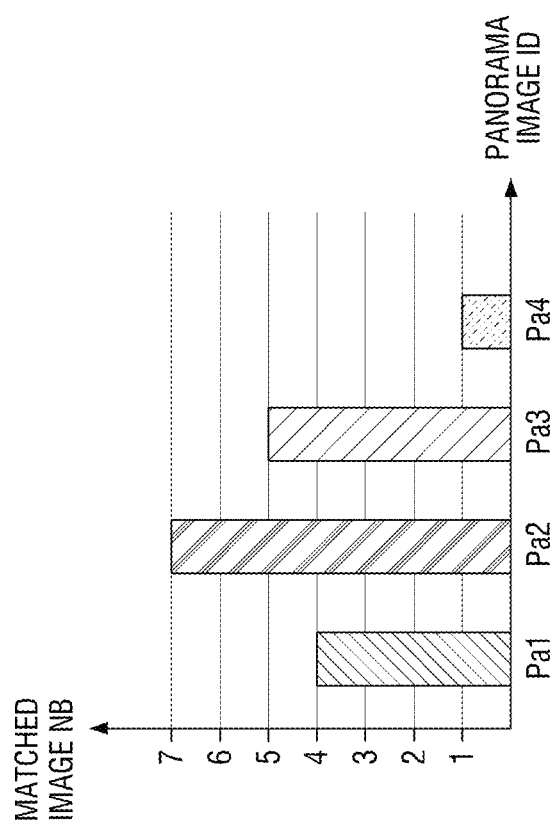

For example, referring to FIG. 8, the histogram module 310 may count the number of similar images between the perspective images generated from the first to fourth panoramic images Pa1, Pa2 Pa3, and Pa4 and the images received from the user and display it in a graph.

The histogram module 310 may output the number of similar perspective images by the ID of each panorama image, and the weight of each panoramic image computed based on the calculated result may be transmitted to the ranking module 320.

Additionally, the method for determining the similarity between the respective images in the histogram module 310 may use some of the parameters described above in various ways or various conventional methods for determining the similarity of images may be used.

The ranking module 320 may compute the similarities with the images received from the user by referring to the global feature (GF Vector), classification information, position information, caption, and segmentation for each panoramic image stored in the database 120.

In this case, the ranking module 320 may compute the similarities by taking into account the weight for each panoramic image received from the histogram module 310 as well.

The ranking module 320 may calculate similarities by using the similarity for each parameter derived from the panoramic images and the weights received from the histogram module 310, and based on this, may select a panoramic image with the highest similarity to the image provided by the user.

Accordingly, the ranking module 320 may output an ID corresponding to the panoramic image selected.

The indoor localization method of the described technology extracts and uses local features of each image in order to compute the relative positional relationship between the panoramic image corresponding to the ID outputted from the ranking module 320 and the perspective image provided by the user. At this time, the server 1100 of the described technology may extract local features using the deep learning technique.

Additionally, as a matter of course, the histogram module 310 or the ranking module 320 may be omitted for implementation in the hybrid image retrieval module in accordance with other embodiments of the described technology.

In the following, a local feature extraction module that extracts local features from the panoramic image selected and the images provided by the user will be described in detail.

Figure 9:
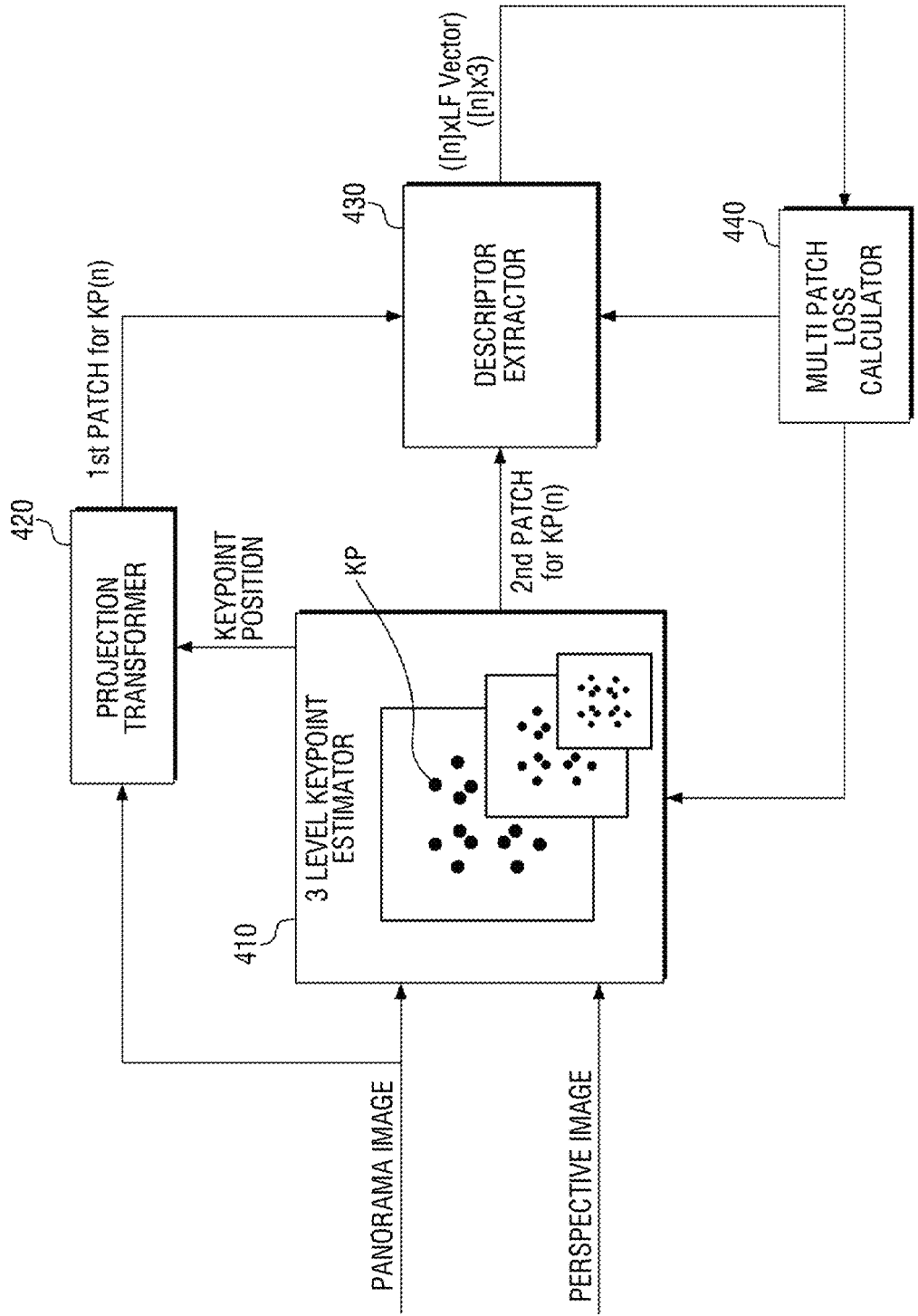
FIGS. 9 and 10 are block diagrams for illustrating a local feature extraction module that performs steps S150 and S160 of FIG. 2.

FIG. 9 is a block diagram for illustrating a module that performs steps S150 and S160 of FIG. 2.

Referring to FIG. 9, a local feature extraction module in accordance with an embodiment of the described technology includes a key point estimator 410, a projection transformer 420, a descriptor extractor 430, and a multi-patch loss calculator 440.

Specifically, the key point estimator 410 extracts key points (KP; hereinafter, feature points) included in an image.

In this case, the key point estimator 410 may extract and use feature points KP from images of different levels, respectively.

For example, the key point estimator 410 may extract feature points KP from three layers converted into different sizes, where the second layer may be ¼ the size of the first layer, and the third layer may be set to ¼ the size of the second layer. In addition, different numbers of feature points KP may be extracted from the respective layers.

The key point estimator 410 may generate a patch of a predetermined size based on each feature point KP for each feature point KP extracted. For example, the patch may be an image consisting of 32×32 pixels centered on the feature point KP, and may be formed for each of the layers described above (e.g., each of the first to third layers).

The patch for each feature point KP generated by the key point estimator 410 may be transmitted to the descriptor extractor 430. Further, the position information for each feature point KP extracted may be transmitted to the projection transformer 420.

The projection transformer 420 may form a patch for the panoramic image inputted based on the position information of the feature point KP received. However, since a panoramic image is composed of spherical coordinates, the projection transformer 420 sets an area corresponding to the feature point KP received, and then transforms the patch into a form corresponding to the perspective image through coordinate system transformation.

In other words, the projection transformer 420 generates a patch by specifying an area at a location, which corresponds to the feature point KP, on the panoramic image and transforming the specified area into a form that can be compared with the perspective image.

Likewise, the patch for each feature point KP generated by the projection transformer 420 may be transmitted to the descriptor extractor 430.

The descriptor extractor 430 may calculate and output a value corresponding to the local feature for each patch. At this time, the local feature may include a vector value (LF Vector; e.g., a vector value of 128 digits), and may also include coordinate information ([n]x3; e.g., x-coordinate, y-coordinate, and a scale).

In this case, the descriptor extractor 430 may be implemented with a deep learning algorithm including a neural network, and may be subjected to learning to output the same or similar local features for a patch of the same target.

The local features of each patch outputted from the descriptor extractor 430 are provided to the multi-patch loss calculator 440.

The multi-patch loss calculator 440 may provide feedback values for subjecting the neural network module included in the descriptor extractor 430 to learning. That is, the multi-patch loss calculator 440 may derive a difference value between the result values outputted at different time points from the descriptor extractor 430, and provide the difference value derived to the descriptor extractor 430 as feedback.

For example, when patches are extracted for the panoramic image and the perspective image that include the same target and local features corresponding to the patches are inputted, the multi-patch loss calculator 440 may provide the difference value between the local features as feedback to the descriptor extractor 430.

The descriptor extractor 430 may transform the weights of the neural network by using the feedback value provided. In this case, the descriptor extractor 430 may further include a weight module that applies a weight to the neural network and based on this, outputs a result value. Through this, the descriptor extractor 430 may be subjected to learning to output a unified local feature for patches that represent the same target.

On the one hand, if a panoramic image is inputted into the local feature extraction module, the panoramic image may go through the projection transformer 420 to generate a patch. On the other hand, if a perspective image is inputted into the local feature extraction module, the perspective image does not go through the projection transformer 420 and a patch may be generated by the key point estimator 410.

The local feature extraction module may operate in a learning mode and an execution mode separately.

In the learning mode, the local feature extraction module may be subjected to learning to increase the accuracy of determining the similarities of the respective images through a preset learning dataset.

In the learning mode, the descriptor extractor 430 generates first and second local features, respectively, for the first patch ($1^{st}$ patch) received from the projection transformer 420 and the second patch ($2^{nd}$ patch) received from the key point estimator 410, and transmits them to the multi-patch loss calculator 440. The multi-patch loss calculator 440 may calculate a similarity between the first and second local features for the first patch and the second patch to calculate a feedback value, and provide the feedback value calculated to the descriptor extractor 430.

Through this, the local feature extraction module may be subjected to learning to output a unified local feature for patches that represent the same target.

On the other hand, in the execution mode, if a panoramic image is inputted into the local feature extraction module, the panoramic image may go through the projection transformer 420 to generate a first patch, and the descriptor extractor 430 may output a first local feature for the first patch generated.

Further, if a perspective image is inputted into the local feature extraction module, the perspective image does not go through the projection transformer 420, a second patch may be generated by the key point estimator 410, and the descriptor extractor 430 may output a second local feature for the second patch generated.

That is, in the local feature extraction module of the described technology, the process of generating the first local feature of the first patch for the panoramic image may be configured differently from the process of generating the second local feature of the second patch for the perspective image.

Figure 10:
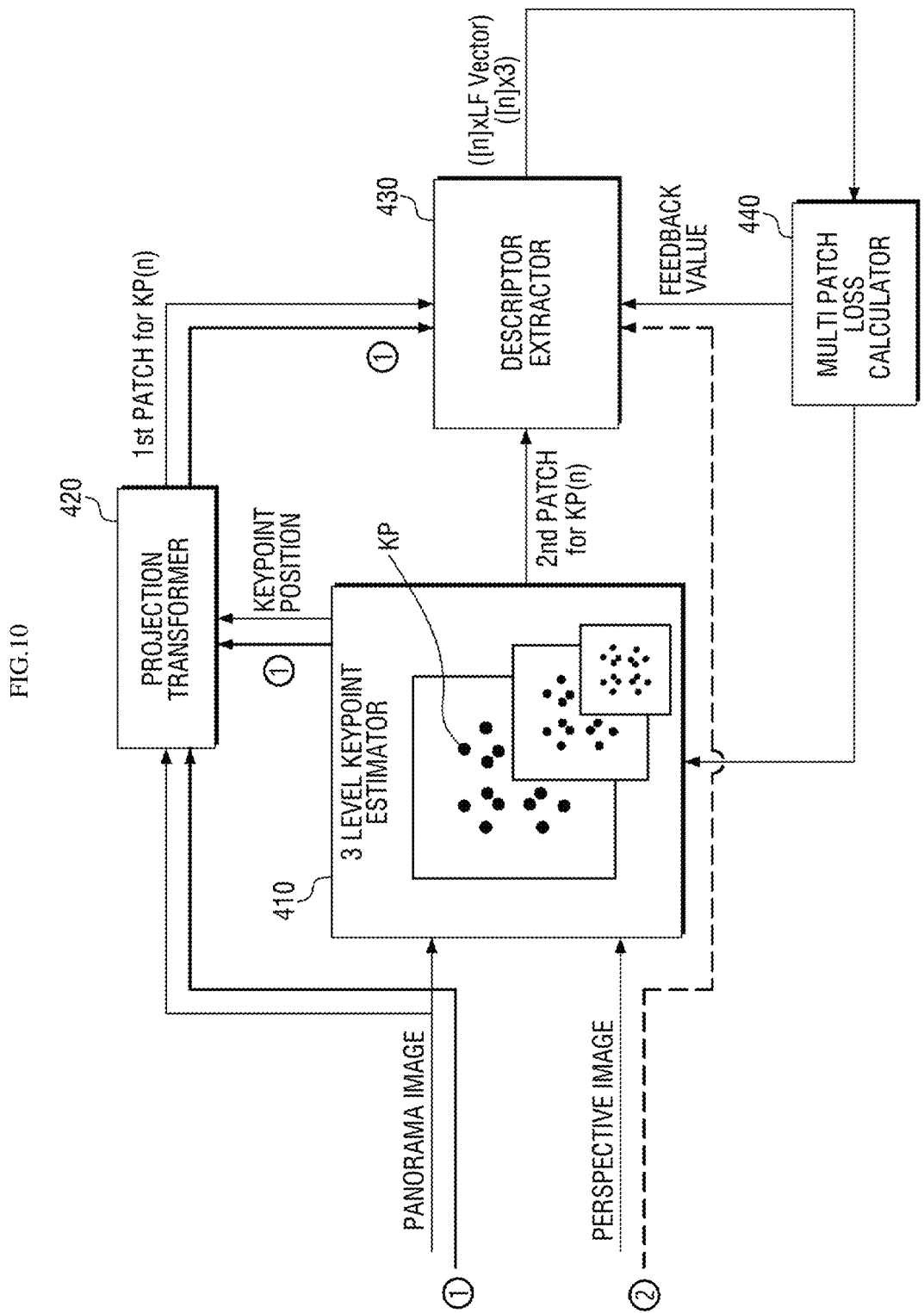

Additionally, the combination of the descriptor extractor 430 and the multi-patch loss calculator 440 of FIG. 10 may be included in a deep learning module, and the deep learning module may have a structure substantially similar to that of the first module 210 of FIG. 5 described above. In addition, since those of ordinary skill in the art to which the described technology pertains can readily derive the structure of the descriptor extractor 430 based on the above description, a repetitive description will be omitted here.

The neural network module included in the descriptor extractor 430 may include an artificial neural network (ANN). For example, a deep learning structure may comprise a deep neural network (DNN) such as a convolutional neural network (CNN), a recurrent neural network (RNN), a deep belief network (DBN), and a graphic neural network (GNN). Further, as a matter of course, models such as triplet loss may be applied to the deep learning module. However, since this is merely an example and the described technology is not limited to the above embodiments, a detailed description thereof will be omitted here.

The server 1100 may perform the mapping between the panoramic image selected previously and the perspective image provided by the user. In this case, the selected panoramic image and the perspective image provided by the user may serve as mapping images.

The server 1100 may calculate a positional relationship between the mapped panoramic image and perspective image.

Here, the mapping images may refer to images having the closest topology to each other. The closest topology may be a case where not only the distance should be close but also it should be able to move directly to each other spatially, and such an example may be images containing the most space in common.

In addition, although performing mapping may mean matching between two images, a case in which the topology of two images, that is, the relative positional relationship thereof is determined will be mainly described in the present specification.

Figure 11:
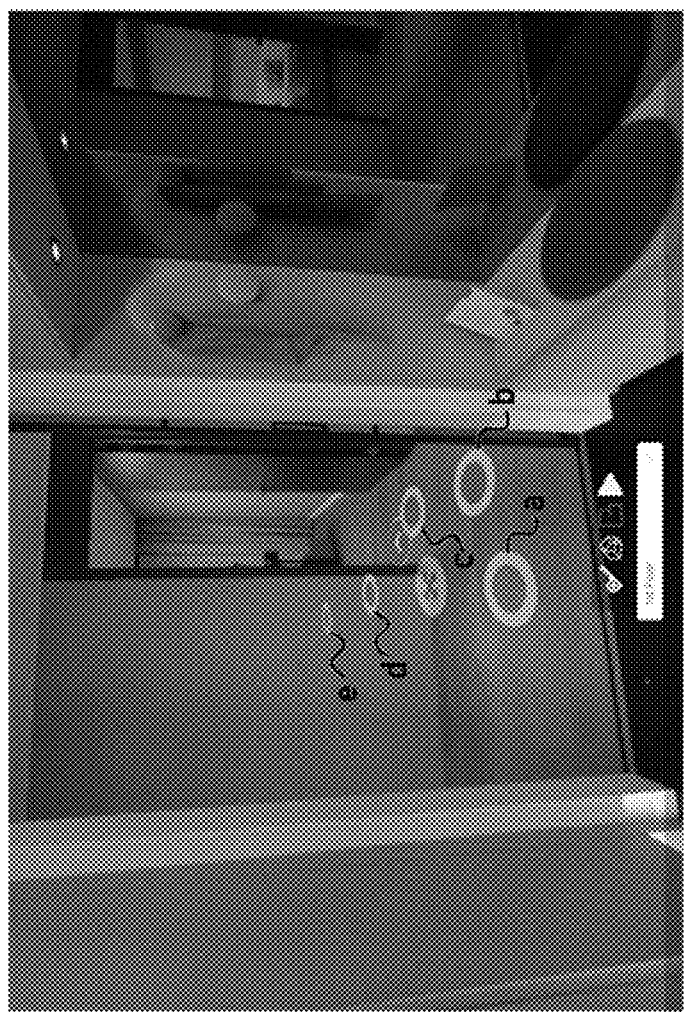
FIG. 11 is a view for illustrating an example of an indoor localization method of the described technology.
Figure 12:
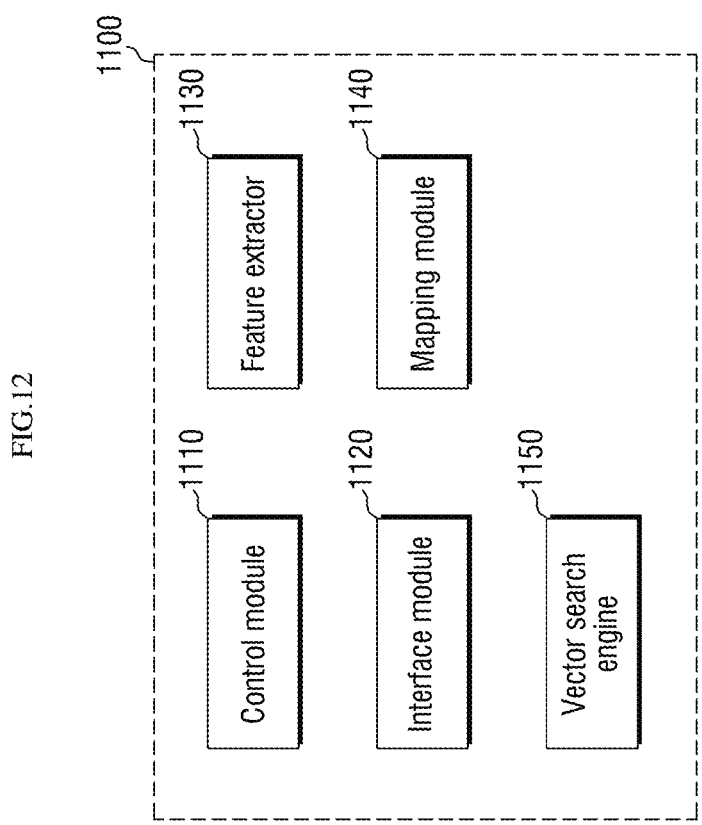
FIG. 12 is a diagram for schematically illustrating the configuration of a 3D tour providing server in accordance with an embodiment of the described technology.
Figure 13:
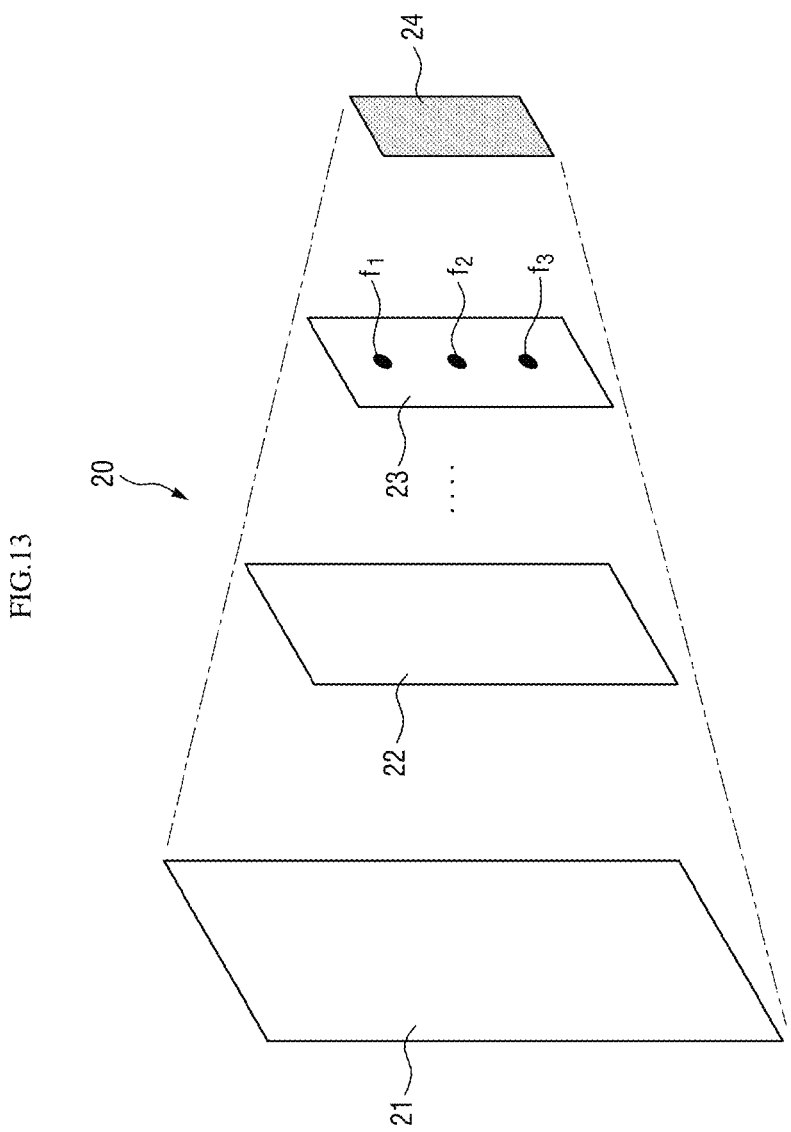
FIG. 13 is a diagram for illustrating the concept of utilizing features of a neural network for an indoor localization method in accordance with an embodiment of the described technology.
Figure 14:
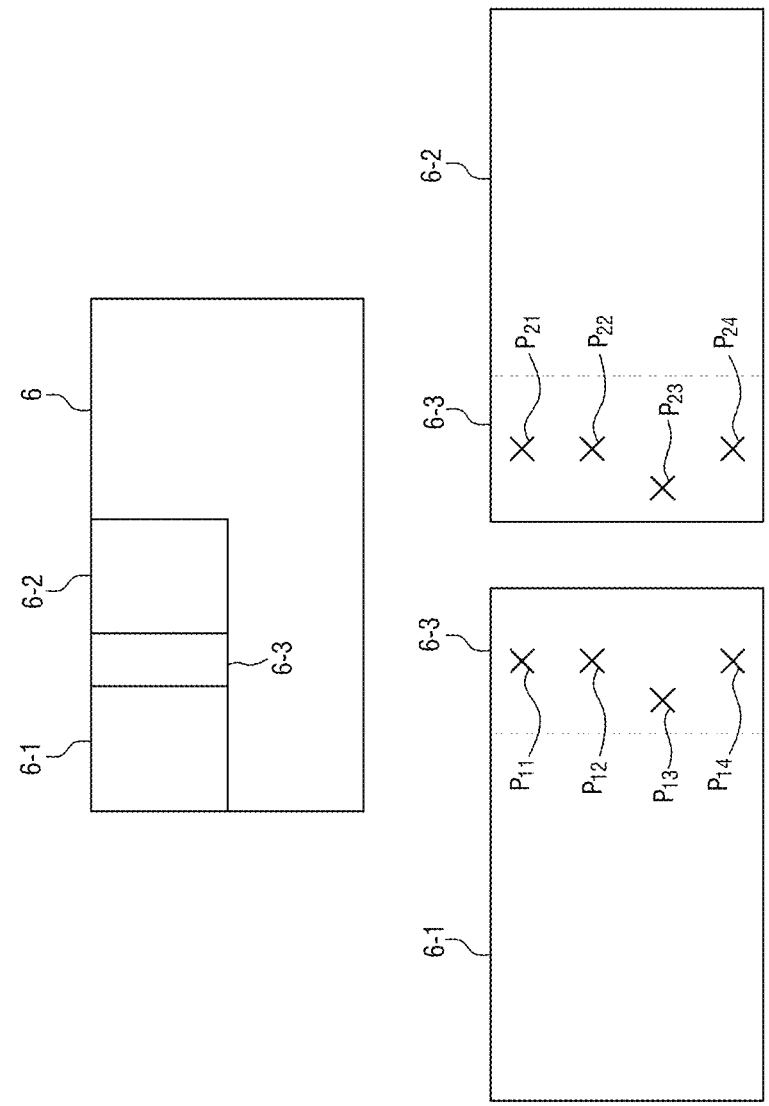
FIGS. 14 and 15 are diagrams for illustrating advantages when utilizing neural network features in accordance with an embodiment of the described technology.
Figure 15:
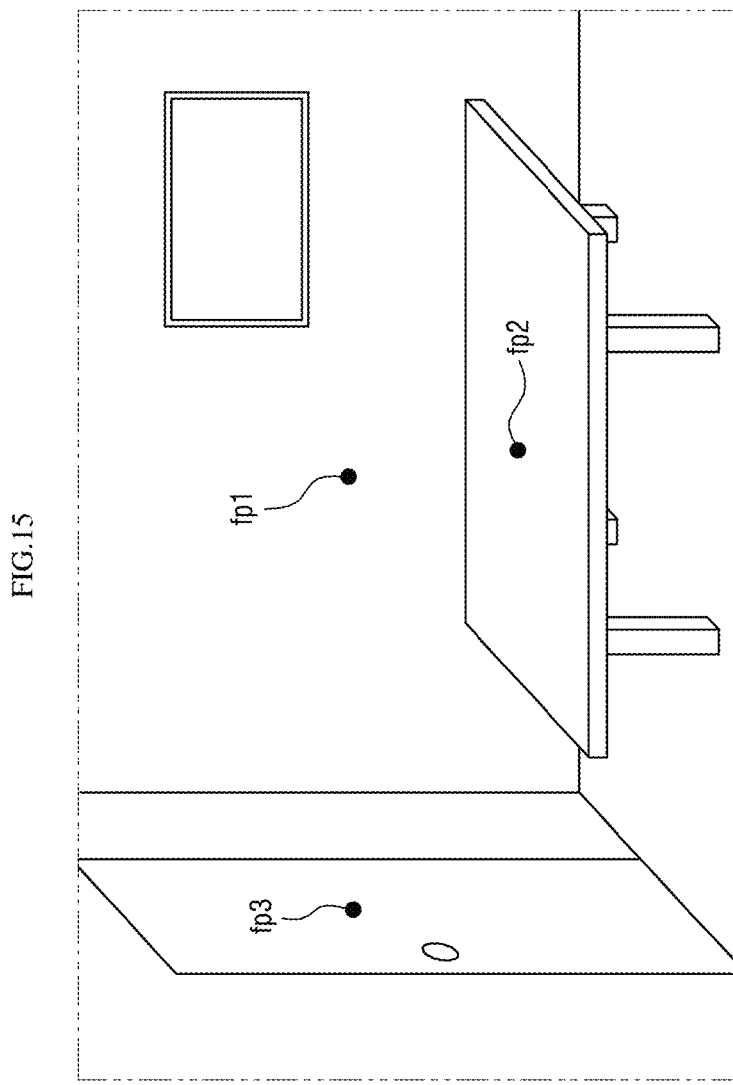

FIG. 11 is a view for illustrating an example of an indoor localization method of the described technology. FIG. 12 is a diagram for schematically illustrating the configuration of a 3D tour providing server in accordance with an embodiment of the described technology. FIG. 13 is a diagram for illustrating the concept of utilizing features of a neural network for an indoor localization method in accordance with an embodiment of the described technology. FIGS. 14 and 15 are diagrams for illustrating advantages when utilizing neural network features in accordance with an embodiment of the described technology.

The 3D tour providing system may receive a plurality of (e.g., five) images. Then, the 3D tour providing system may determine the images that can be mapped to each other out of the plurality of images, that is, which are the mapping images, and may perform mapping of the mapping images determined.

For example, images in an embodiment of the described technology may be omnidirectional images (360 images) captured at different locations. In addition, mapping images may be pairs of images that share the most space in common with each other.

For instance, each of the images captured at positions a, b, c, d, and e may be image 1, image 2, image 3, image 4, and image 5, as shown in FIG. 11.

In such a case, image 1, image 2, and image 3 contain quite a large amount of common space within the common captured image, but relatively more common space may be included in image 1 and image 2. Therefore, the mapping image of image 1 may be image 2.

Then, it is necessary to search for a mapping image for image 2, and at this time, image 1 for which the mapping image has already been determined may be excluded. Then, the mapping image of image 2 may be image 3.

In this way, the mapping image of image 3 may be image 4, and the mapping image of image 4 may be image 5.

Then, the 3D tour providing system may perform mapping on image 2 which is a mapping image based on image 1. That is, the relative position of the topology image 2 for image 1 of image 2 with respect to image 1 may be determined. And, by sequentially determining the topology of image 3 with respect to image 2, the topology of image 4 with respect to image 3, and the topology of image 5 with respect to image 4, the topology between all images may be specified.

After all, conventionally, if there exist a plurality of omnidirectional images and the exact position of each of the omnidirectional images cannot be known, it may take considerable amount of time and resources to determine the positional relationship of the plurality of images.

For example, according to conventional methods, it is necessary to extract predetermined feature points (e.g., the key points (KP) described above) for each and every image, and use the feature points extracted to determine how many common feature points exist for each and every image pair. And, image pairs having the most feature points in common may be determined as mapping images to each other, and mapping, that is, a relative positional relationship may be determined according to the locations of common feature points. If matching is required, a transformation matrix for causing the common feature points to overlap with minimal error is determined, and the two images can be connected (matched) through transformation of any one image through such a transformation matrix.

However, for the feature points used in such conventional methods, it takes a considerable amount of time and computation to extract just the feature points. Further, it is necessary to perform an operation of comparing feature points for each and every image pair in order to determine the mapping images, where there is a problem that the more the number of feature points in the images, the more considerable amount of time this operation takes.

However, according to the technical idea of the described technology as described above, it is possible to quickly and accurately automatically search for mapping images out of such a plurality of images and to perform mapping on the mapping images found.

In order to solve such a problem, the 3D tour providing system in accordance with the technical idea of the described technology may use neural network features.

Neural network features as defined herein may refer to all or some of the features selected from a feature map of predetermined layers of a learned neural network that has been subjected to learning to achieve a predetermined purpose.

These features may be used in a neural network (e.g., a convolutional neural network (CNN)) that has been subjected to learning to achieve a particular purpose, and may be information derived by a learned neural network when the neural network has been subjected to learning to achieve the particular purpose.

For example, a neural network 20 as shown in FIG. 13 may be present, and the neural network may be a convolutional neural network (CNN).

In such a case, a plurality of layers 21, 22, 23, and 24 may be included in the neural network 20, and there may be present an input layer 21, an output layer 24, and a plurality of hidden layers 22 and 23. The output layer 24 may be a layer fully connected to the previous layer, and the 3D tour providing system in accordance with the technical idea of the described technology may select neural network features f1, f2, and f3 from a layer (e.g., 23) including an arbitrary feature map preceding the output layer 24 or the fully connected layer.

The neural network features f1, f2, and f3 used by the 3D tour providing system may be all of the features included in a feature map of the corresponding layer, or may be features selected in part out of them.

The 3D tour providing system may use these features in place of conventional handcrafted feature points, for example, SIFT (scale-invariant feature transform), SURF (speeded up robust features), or ORB (oriented FAST and rotated BRIEF) to determine mapping images, or may be used to perform the mapping between mapping images. That is, features used in convolutional neural networks may be used in place of conventional handcrafted features.

In general, it is desirable that the features of an image should have the same characteristics regardless of scale or orientation, and the layer before the output radar 23 in the convolutional neural network will have these characteristics through a plurality of nonlinear convolutional functions and/or pooling functions, etc. Moreover, conventional handcrafted features are characterized by being extracted only from characteristic locations defined by a person, such as corners or the like in an image, and usually being extracted only from places where edges are present (e.g., a location where an edge is bent, etc.).

However, the neural network features have an advantage that the neural network 20 can be subjected to learning so that they can be found not only in such locations but in flat areas of an image as well. In addition, handcrafted features often have feature points that should be detected but not detected depending on image distortion or image quality, whereas the neural network features have a character of being much more robust to such image distortion, and thus, there may be an improvement in accuracy even in feature extraction.

The neural network 20 may itself be a feature extractor 1130 as well. For example, if features are selected from the layer 23 immediately preceding the output layer 24 or the fully connected layer, the output layer 24 may be designed to output the selected features f1, f2, and f3 themselves of the immediately preceding layer 23, and in this case, the neural network 20 itself may act as the feature extractor 1130.

Further, the neural network 20 may also be one that has been subjected to learning to achieve a distinct and unique purpose (e.g., classification, object detecting, etc.). Even in such a case, features that are always consistent may be selected from a predetermined layer and used as neural network features. For example, in the case of FIG. 13, the combination of the remaining layers except for the output layer 24 may operate as the feature extractor 1130.

According to an embodiment of the described technology, the neural network 20 may be a neural network that has been subjected to learning so as to be able to derive an optimal transformation relationship (e.g., that minimizes the error), so that the points corresponding to each other extracted, respectively, from the overlapping common area of each of the divided images after dividing any one image so that there exists an overlapping area can be matched.

For example, all or part of a given image 6 may be divided such that an overlapping common area 6-3 is present, as shown in FIG. 14. And a predetermined number of points (e.g., P11 to P14 and P21 to P24) corresponding to each other may be extracted from each of the divided images 6-1 and 6-2.

Then, the neural network that is subjected to learning so that the points P11 to P14 extracted from the first divided image 6-1 and the points P21 to P24 extracted from the second divided image 6-2 can be converted with a minimal error (e.g., determine the parameters of the transformation matrix) may be implemented as the neural network 20.

In this case, the points (e.g., P11 to P14 and P21 to P24) may be arbitrarily selected points, or may also be feature points extracted from a common area of the respective images in a predetermined manner.

In either case, all or part of the neural network 20 that has been subjected to learning well to achieve a predetermined purpose may be used as a feature extractor (1130 in FIG. 12) for selecting and extracting features from an image.

And the same feature may be extracted from a common area included in each of the different images received by the 3D tour providing system using such a feature extractor 1130. Accordingly, an image in which the same features (features corresponding to each other) exist the most in any one image may be determined as the mapping image.

On the other hand, according to the technical idea of the described technology, since the neural network features are represented in vectors, it is possible to determine the positional relationship more quickly by using a vector search engine (1150 of FIG. 12) capable of high-speed operation instead of comparing features for each image pair as in the prior art to search for a mapping image of a particular image.

Techniques for searching large-capacity vectors at high speed have recently been widely disclosed.

The vector search engine 1150 may be an engine constructed to find, at high speed, vectors closest (shortest) to a vector (or a set of vectors) being inputted. All vectors are indexed and stored on a DB, and the vector search engine 1150 may be designed to output a vector (or a set of vectors) closest to a vector (or a set of vectors) being inputted.

Such a vector search engine 1150 may be constructed using known vector search techniques such as, for example, fairs or the like. Such a vector search engine 1150 has an effect of enabling large-capacity and high-speed operations when executed on a GPU basis.

The vector search engine 1150 in accordance with the technical idea of the described technology may receive a set of features extracted from a target image (e.g., image 1), and in response, output a vector or a set of vectors that are the most similar (shortest). And a mapping image of a target image may be determined at high speed by determining which image is the source of such a vector or set of vectors.

For example, all of the features extracted from the first image may be inputted into the vector search engine 1150. The vector search engine 1150 may output, from the vector DB, a vector having the shortest distance to each of the inputted features or a distance to the vector having the shortest distance. This task may be performed for each image.

For example, if it is assumed that there are five images and ten (10) features are extracted for each of the images, then fifty (50) vectors may be indexed and stored in the vector DB. And information about each source image may be stored together.

Then, the vector search engine 1150 may receive ten (10) vectors extracted from the first image. And the vector search engine 1150 may output ten vectors having the shortest distance, among the vectors extracted from the second image, to each of the ten vectors or the sum of the distances thereof. In this way, if performed on the vectors extracted from the third image, the vectors extracted from the fourth image, and the vectors extracted from the fifth image, images containing the feature sets closest to the vector set inputted may be searched at high speed. And the found image may be determined as the mapping image of the first image.

Depending on embodiments, the vector search engine 1150 may output the entirety of the remaining vectors (forty) except for the ten vectors extracted from the first image, in the order of vectors having the shortest distance to each of the ten vectors outputted from the first image. For example, if a list of ten vectors is outputted, the 3D tour providing system may analyze the list of vectors and output a mapping image.

The results outputted by the vector search engine 1150 or the ways the vector search engine 1150 outputs may vary.

However, in any case, according to the technical idea of the described technology, features may be extracted from each of the images inputted, these features may be entered into a DB constructed to enable vector search, and the vector search engine 1150 may perform a function of outputting the most similar (shortest) vector or a set thereof when receiving a vector or set of vectors being inputted. These functions allow high-speed search for mapping images.

Depending on embodiments, not all features of a target image, that is, an image (e.g., a first image) for which a mapping image is to be found, may be inputted, but some features may be inputted into the vector search engine 1150. For example, only the features corresponding to predefined areas in an image may be inputted into the vector search engine 1150 to determine the positional relationship.

Since the predefined areas may usually be areas adjacent to the left, right, top, and bottom edges rather than the central portion of an image, outer areas of the image are arbitrarily set, and features at locations corresponding to the set areas may be optionally used as an input for vector search. Of course, the vector DB may also receive only the features corresponding to these outer areas, or may receive all features.

In addition, the neural network features in accordance with the technical idea of the described technology do not specify by themselves the locations in the image from which they have been extracted. Therefore, mapping can be performed only when the locations (points) in the original image corresponding to the neural network features are specified. Accordingly, a technical idea for specifying the locations on the original image corresponding to the neural network features is required, which will be described later with reference to FIG. 16.

The 3D tour providing server 1100 for implementing the technical idea described above may be defined by a functional or logical configuration as shown in FIG. 12.

Referring to FIG. 12, the server 1100 in accordance with the technical idea of the described technology includes a control module 1110, an interface module 1120, and a feature extractor 1130. The server 1100 may further include a mapping module 1140 and/or a vector search engine 1150.

The server 1100 may refer to a logical configuration with hardware resources and/or software necessary to implement the technical idea of the described technology, and does not necessarily mean a single physical component or a single device. In other words, the server 1100 may refer to a logical combination of hardware and/or software provided to implement the technical idea of the described technology, and may also be implemented as a set of logical configurations for implementing the technical idea of the described technology by being installed in devices spaced apart from each other and performing their respective function, if necessary.

In addition, the server 1100 may also refer to a set of configurations individually implemented for each function or role for implementing the technical idea of the described technology. For example, each of the control module 1110, the interface module 1120, the feature extractor 1130, the mapping module 1140, and/or the vector search engine 1150 may be located in different physical devices, or may be located in the same physical device.

Also, depending on implementations, a combination of software and/or hardware constituting each of the control module 1110, the interface module 1120, the feature extractor 1130, the mapping module 1140, and/or the vector search engine 1150 may also be located in different physical devices, and the configurations located in different physical devices may be organically combined with each other to implement each of the modules.

Further, a module as used herein may mean a functional and structural combination of hardware for carrying out the technical idea of the described technology and software for driving the hardware. For example, a module may mean a logical unit of a given code and a hardware resource for executing the given code, and it can be readily inferred by those of ordinary skill in the art of the described technology that it does not necessarily mean a physically connected code or one type of hardware.

The control module 1110 may control other components (e.g., the interface module 1120, the feature extractor 1130, the mapping module 1140, and/or the vector search engine 1150, etc.) included in the server 1100 to implement the technical idea of the described technology.

The interface module 1120 may receive a plurality of images from the outside. The plurality of images may be images captured at different locations. According to an example, the plurality of images may be a plurality of panoramic images (i.e., 360 images) included in a 3D tour captured indoors. Also, the interface module 1120 may receive perspective images captured directly by the user.

Among the plurality of images, there may exist those obtained by capturing a common space at different positions, and two images including a common space, that is, a common area, may be defined to be in a mappable relationship. Among them, images containing the most areas in common may be defined as mapping images, and these may be defined as images having the most features corresponding to each other.

From each of the plurality of images inputted through the interface module 1120, the feature extractor 1130 may extract features defined according to the technical idea of the described technology, that is, neural network features. Here, the neural network features may be understood as a concept including the global features and/or local features described above. In the following, the global features or local features described above will be substituted and described with neural network features for the convenience of description.

As described above, the neural network features may be features of an image specified before an output layer in a given neural network (e.g., CNN).

The feature extractor 1130 may correspond to the global descriptor module 210 of the hybrid image retrieval module described above with reference to FIG. 5. Also, the feature extractor 1130 may correspond to the descriptor extractor 430 described with reference to FIGS. 9 and 10.

Further, the feature extractor 1130 may be the neural network 20 itself as shown in FIG. 13, or may mean the configuration ranging from the input layer 21 to a predetermined layer (e.g., 23) before the output layer 24 in the neural network. All or some of the features included in the feature map defined by the layer 23 may be neural network features.

Although the neural network 20 may the one that has been subjected to learning for separate purposes (e.g., classification, detecting, etc.) other than the purpose of extracting neural network features, it may be a neural network designed to match two images with a minimal error, or it may be a neural network that is subjected to learning for the purpose of extracting neural network features, as described above. For example, in the latter case, it may be subjected to learning to output handcrafted feature points that can well represent locations set arbitrarily by a user and/or image features, and in this case, the neural network 20 itself may serve as the feature extractor 1130.

The location set arbitrarily by the user may be set as a location set by the user (e.g., the center position of an object) in a given object (e.g., a wall, a door, etc.). In addition, these locations set by the user may be set in flat areas, that is, in flat image areas where no edges or corners are present, as opposed to the conventional handcrafted feature points. In this case, features can be defined even in flat image areas from which no feature point would be extracted in conventional handcrafted feature points, and when this is utilized, more accurate determination and mapping of mapping images can be performed.

As shown in FIG. 15, the feature extractor 1130 may be subjected to learning so that arbitrary locations within given objects (e.g., a wall, door, table) may be specified as feature points fp1, fp2, and fp3.

Further, the arbitrary locations may be set in normally flat image areas, such as a predetermined location for each object (e.g., the center of a wall, the center of a table, the center of a door, etc.), as shown in FIG. 15.

Of course, the feature extractor 1130 may also be subjected to learning so as to be able to extract features corresponding to handcrafted feature points, such as conventional portions where an edge or corner is bent, etc.

For example, a user may annotate handcrafted feature points and set locations of flat areas set by the user for each object on a number of images, and use these as learning data to subject the neural network 20 to learning. In this case, features corresponding to each of the feature points fp1, p2, and fp3 may be extracted, and the feature points themselves may also be outputted.

In either case, if the neural network features are used, locations that would not be extracted with conventional handcrafted features may be utilized as features, as shown in FIG. 14, and thus there may be advantageous effects in defining image characteristics or mapping images.

On the other hand, although the neural network features are characteristic information of an image determined through a plurality of convolutions and/or pooling in order for the neural network 20 to output the desired purpose, such neural network features themselves may not indicate specific locations in the corresponding original image.

Therefore, even when the neural network features are extracted, the locations on the original image corresponding to the neural network features, that is, the feature locations need to be specified. This is because the mapping of the images can be performed only when the locations of such features are specified.

The technical idea for specifying the feature locations of the neural network features as such will be described with reference to FIG. 16.

Figure 16:
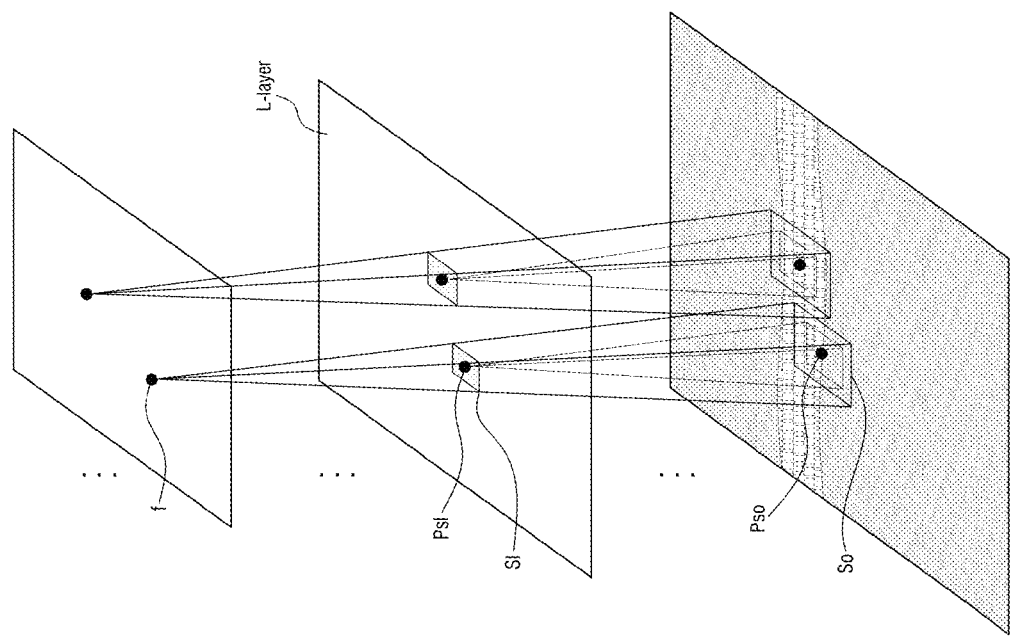
FIG. 16 is a diagram for illustrating feature locations corresponding to neural network features in accordance with an embodiment of the described technology.

FIG. 16 is a diagram for illustrating feature locations corresponding to neural network features in accordance with an embodiment of the described technology.

As shown in FIG. 16, a neural network feature f may be extracted from a predetermined layer. In this case, the neural network feature f corresponds to a predetermined corresponding area S1 in a given preceding layer L-Layer, and the pixel information contained in this corresponding area S1 may be mapped to the neural network feature f by predefined convolution and pooling functions.

In this case, a predetermined location (e.g., the center or a particular vertex, etc.) in the corresponding area S1 of the neural network feature f in the L-layer may be defined as a corresponding location Ps1 in the L-layer for the neural network feature f.

Then, in the same way, a corresponding area So on the original image corresponding to the corresponding location PS1 in the L-layer may be specified by the convolutional and pooling relationship between the original image and the L-layer, and a predetermined location (e.g., the center) in the corresponding area So may be specified as a corresponding location on the original image of the neural network feature f, that is, a feature location.

When a feature location is determined for each neural network feature in this way, each feature location may be a feature point for image mapping.

Then, the mapping module 1140 may perform image mapping using feature locations corresponding to each other between the mapping images.

Image mapping between two images may be performed using points corresponding to each other in each of the two images, in the case of mapping for specifying a relative positional relationship between the two images. In this case, the points corresponding to each other may be feature points of the neural network features extracted from each of the two images, and the feature points corresponding to each other may be readily searched for through the vector search engine 1150.

In this case, the vector search engine 1150 may include the hybrid image retrieval module described above with reference to FIG. 3. For instance, the vector search engine 1150 calculates global features for each of a plurality of panoramic images included in the 3D tour and a perspective image received from a user. The vector search engine 1150 may use the calculated global features to select a panoramic image most similar to the perspective image.

The feature extractor 1130 calculates a local feature of the selected panoramic image and a local feature of each of the perspective images received from the user. In this case, the selected panoramic image and the perspective image may be the images to be mapped.

The mapping module 1140 calculates the relative positional relationship of the images to be mapped.

If points corresponding to each other (representing the same location in space) are present in different images, respectively, the technical idea for specifying the relative positional relationship between these two images has been known.

For instance, it can be readily inferred by those of ordinary skill in the art of the described technology that a relative positional relationship can be determined using epipolar geometry. Besides, various methods may also be possible.

According to another embodiment, if the mapping between two images, that is, between the mapping images, matches the two images, specifying a transformation matrix for matching the two images may be the one performing the mapping.

It is widely known that in order to specify such a transformation matrix, three pairs of features corresponding to each other are extracted and a transformation matrix may be defined so that the three pairs extracted can be transformed. And these three pairs of features may be searched for so that all features can be transformed with the smallest error, and of course, algorithms such as RANSAC may be used.

FIG. 17 is a flowchart for illustrating a method for mapping images in an indoor localization method in accordance with an embodiment of the described technology.

Referring to FIG. 17, the server 1100 in accordance with the technical idea of the described technology may specify feature locations corresponding to the features extracted from a first image (S210) in order to map the first image (e.g., a selected panoramic image) and a second image (e.g., a perspective image provided by a user) that have been determined as mapping images to each other. To this end, the server 1100 may use the method as shown in FIG. 16.

The server 1100 may specify feature locations corresponding to the features extracted from the second image (S220).

The server 1100 may determine a relative positional relationship through an epipolar geometry algorithm based on the feature locations of each of the images, or determine a transformation matrix for connecting the images through a predetermined manner (e.g., a RANSAC algorithm) (S230).

Through this, the server 1100 may calculate the positional relationship between the selected panoramic image and the perspective image received from the user.

Therefore, the server 1100 can compute the indoor location of a user device 1200 that has captured the perspective image. The computed indoor location of the user device 1200 may be transmitted to the user device 1200, and a 3D tour that is accurate in providing an indoor navigation function may be provided to the user device 1200.

The indoor localization method in accordance with embodiments of the described technology can be implemented as a computer-readable code on a computer-readable recording medium. The computer-readable recording medium includes all types of recording devices in which data that can be read by a computer system is stored. Examples of the computer-readable recording medium include ROMs, RAMs, CD-ROMs, magnetic tapes, hard disks, floppy disks, optical data storage devices, etc. In addition, the computer-readable recording media may be distributed over computer systems connected through a network, so that the computer-readable code can be stored and executed in a distributed manner. And functional programs, codes, and code segments for implementing the described technology can be readily inferred by programmers in the art to which the described technology pertains.

As described above, although the described technology has been described with limited embodiments and drawings, the described technology is not limited to the embodiments above and can be modified and changed in various ways from such a description by those of ordinary skill in the art to which the described technology pertains. Therefore, the spirit of the described technology should be grasped only by the claims set forth below, and all equal or equivalent variations thereof are intended to fall within the scope of the spirit of the invention.

What is claimed is:

1. An indoor localization method performed in a 3D tour providing server operating in conjunction with a user device, the method comprising:
    opening a 3D tour comprising a plurality of panoramic images;
    receiving a first perspective image captured by a camera provided in the user device;
    calculating global features for the first perspective image and each of the plurality of panoramic images included in the 3D tour;
    selecting a most similar panoramic image to the first perspective image by using the calculated global features;
    computing an indoor location corresponding to a location of the camera on the 3D tour by using feature points included in the selected panoramic image and the first perspective image; and
    providing the computed indoor location to the user device.

2. The indoor localization method of claim 1, wherein the calculating global feature comprises:
    (a) converting a particular panoramic image included in the 3D tour into a plurality of second perspective images; and
    (b) calculating respective global features for the converted second perspective images and a global feature for the panoramic image.

3. The indoor localization method of claim 2, wherein the step (a):
    projects the particular panoramic image onto a spherical coordinate system, to thereby divide it into a plurality of regions, and
    converts images corresponding to the respective divided regions into the second perspective images, which are two-dimensional images, and
    wherein the plurality of second perspective images includes areas partially overlapping each other.

4. The indoor localization method of claim 2, wherein the step (b):
    calculates the global features using a deep learning module that has been subjected to learning in advance so that a same global feature is outputted for images captured the same place, and
    wherein the deep learning module comprises:
    one or more neural network modules;
    a similarity determination module configured to calculate similarities of values outputted from the neural network modules;
    a weight module configured to apply weights to the calculated similarities and based on this, to output result values; and
    a feedback module configured to derive a difference value between result values outputted at different time points from the weight module, and to provide the derived difference value as feedback to the neural network modules.

5. The indoor localization method of claim 4, wherein the neural network module:
    adjusts a weight applied to a neural network included in the neural network module, based on a feedback value received from the feedback module.

6. The indoor localization method of claim 4, wherein the similarity determination module:
    receives a first global feature for the panoramic image, a second global feature for the second perspective image, a third global feature for a comparative image, and a fourth global feature corresponding to a ground truth for the panoramic image, and
    calculates similarities between the first to fourth global features, using a cosine distance function.

7. The indoor localization method of claim 1, further comprising:
    deriving classification information, position information, caption, and segmentation for the first perspective image and the plurality of panoramic images,
    wherein the calculating a most similar panoramic image comprises:
    (c1) computing a similarity for each parameter between the panoramic image and the first perspective image, based on the derived global features, the classification information, the position information, the caption, and the segmentation; and
    (d) calculating a ranking based on the similarity for each parameter, and selecting a panoramic image that is the highest in the ranking.

8. The indoor localization method of claim 7, wherein the calculating a most similar panoramic image comprises:
(c2) computing similarities between second perspective images generated based on the panoramic image and a first perspective image received from the user device, counting the number of images of the second perspective images with the similarities at or higher than a predetermined reference value for each panoramic image, and determining a weight of each panoramic image based on the counted number.

9. The indoor localization method of claim 8, wherein the step (d) comprises:
selecting a panoramic image having a highest similarity to the first perspective image, by using the similarity between the panoramic image and the first perspective image for the derived global features, the classification information, the position information, the caption, and the segmentation, and the weight for the panoramic image.

10. The indoor localization method of claim 1, wherein the computing an indoor location comprises:
calculating local features for the calculated panoramic image;
calculating local features for the perspective image; and
computing an indoor location corresponding to a location of the camera on the 3D tour based on the calculated local features.

11. An indoor localization method performed in a 3D tour providing server operating in conjunction with a user device, the method comprising:
opening a 3D tour comprising a plurality of panoramic images;
receiving a perspective image captured by a camera provided in the user device;
calculating global features for the plurality of panoramic images and the perspective image;
selecting a panoramic image most similar to the perspective image by using the calculated global features;
calculating local features for the selected panoramic image and the perspective image;
computing an indoor location corresponding to the camera location on the 3D tour based on the calculated local features; and
providing the computed indoor location to a user.

12. The indoor localization method of claim 11, wherein in the calculating local features,
a process of generating a first patch for the panoramic image is configured differently from a process of generating a second patch for the perspective image.

13. The indoor localization method of claim 11, wherein the calculating local features comprises:
(a) converting the panoramic image into a plurality of layers of different sizes;
(b) extracting a key point (KP) from the converted plurality of layers, and generating a first patch corresponding to the extracted key point; and
(c) deriving a first local feature for the first patch.

14. The indoor localization method of claim 13, wherein in the step (a), the plurality of layers comprises:
a first layer of the same size as the panoramic image;
a second layer obtained by converting the first layer at a predetermined ratio; and
a third layer obtained by converting the second layer at the predetermined ratio.

15. The indoor localization method of claim 13, wherein the step (b) comprises:
extracting position information of a key point for each of the plurality of layers of the panoramic image;
projecting the panoramic image onto a spherical coordinate system, and extracting a patch of an area corresponding to the position information; and
converting the extracted patch into the first patch, which is a two-dimensional image.

16. The indoor localization method of claim 14, wherein in the step (c),
the first local feature is a vector value of a predetermined magnitude, and
further comprising outputting coordinate information including a first-axis coordinate for the first patch, a second-axis coordinate intersecting the first-axis, and a scale.

17. The indoor localization method of claim 11, wherein the calculating local features comprises:
(a) converting the perspective image into a plurality of layers of different sizes;
(b) extracting a key point (KP) from the converted plurality of layers, and generating a second patch corresponding to the extracted key point; and
(c) deriving a second local feature for the second patch.

18. The indoor localization method of claim 11, wherein the calculating local features:
calculates the local features using a deep learning module that has been subjected to learning in advance so that a unified local feature is outputted for images captured the same place, and
wherein the deep learning module comprises:
a descriptor extractor comprising one or more neural network modules, and a weight module configured to apply weights to the neural network modules, and based on this, to output result values; and
a multi-patch loss calculator configured to derive a difference value between result values outputted at different time points from the descriptor extractor, and to provide the derived difference value as feedback to the descriptor extractor.

19. The indoor localization method of claim 18, wherein the multi-patch loss calculator:
receives a first local feature of a first patch for the panoramic image and a second local feature of a second patch for the perspective image; and
comprises calculating a similarity between the first and second local features using a cosine distance function.

20. The indoor localization method of claim 11, wherein the computing an indoor location:
calculates an indoor location of a user who has provided the perspective image, based on the first and second local features, and
comprises calculating the indoor location by determining a relative positional relationship through an epipolar geometry algorithm based on locations of the first and second local features, or by determining the relative positional relationship through a method using a transformation matrix for connecting images.

* * * * *